United States Patent
Tripp

[15] 3,673,395
[45] June 27, 1972

[54] HIGH SPEED DIGITAL TRACKING SYSTEM

[72] Inventor: Robert W. Tripp, Tuckahoe, N.Y.
[73] Assignee: Inductosyn Corporation
[22] Filed: Feb. 5, 1971
[21] Appl. No.: 112,993

[52] U.S. Cl. .................. 235/151.11, 318/611, 235/176, 340/347 AD, 235/92 MP
[51] Int. Cl. ................................. H03k 25/04, G01b 7/02
[58] Field of Search .............. 318/615, 616, 660, 617, 618, 318/611; 235/151.11

[56] References Cited

UNITED STATES PATENTS

| | | | |
|---|---|---|---|
| 2,954,514 | 9/1960 | Hemstreet | 318/611 |
| 3,531,800 | 9/1970 | Brescia | 318/660 |
| 3,573,794 | 4/1971 | Widenor | 340/347 SY |

*Primary Examiner*—Eugene G. Botz
*Attorney*—William E. Beatty and David E. Lovejoy

[57] ABSTRACT

Disclosed is a digital readout system, in which a to-be-measured function $F(x)$ (e.g., space position of an Inductosyn transducer) is tracked and measured by a measuring function $F(y)$ (e.g., electrical signal). The to-be-measured function $F(x)$ typically exhibits velocities $dF(x)/dt$ and/or accelerations $d^2F(x)/dt^2$. In order to match the variations of $F(y)$ to those of $F(x)$, $F(y)$ exhibits an acceleration $d^{pr\ of} F(y)/dt^2$ which by system design at least exceeds any acceleration $d^2F(x)/dt^2$ of $F(x)$ which is to be encountered. The measuring function $F(y)$ is then derived by two controlled integrations of $d^2F(y)/dt^2$. The first integration, controlled by the error signal from an Inductosyn transducer, produces the velocity $dF(y)/dt$ of $F(y)$. The second integration, controlled by the sign of the velocity $dF(y)/$produces $F(y)$ itself. $F(y)$ tracks and is an accurate measure of $F(x)$. Additionally, the velocity $dF(x)/dt$ of $F(x)$ is tracked by the velocity $dF(y)/dt$ of $F(y)$. A second order servo system is produced in which both the velocity and position of the measuring function $F(y)$ track the velocity and position of the to-be-measured function $F(x)$.

23 Claims, 10 Drawing Figures

HIGH SPEED DIGITAL TRACKING SYSTEM

CROSS REFERENCE TO RELATED APPLICATIONS

1. "Trigonometric Signal Generator and Machine Control," Ser. No. 864,079, Filed Oct. 6, 1969, invented by Robert W. Tripp, assigned to Inductosyn Corporation.
2. "Position Measuring System," Ser. No. 809,533, Filed Mar. 24, 1969, now U.S. Pat. No. 3,609,320 invented by Robert W. Tripp, assigned to Inductosyn Corporation.
3. "Position Control System," Ser. No. 814,670, Filed Apr. 9, 1969, now U.S. Pat. No. 3,612,976, invented by Robert W. Tripp, assigned to Inductosyn Corporation.
4. "Scale of Two Improved Digital and Analog Converter," Ser. No. 112,994, Filed Feb. 5, 1971, invented by Robert W. Tripp, assigned to Inductosyn Corporation.

BACKGROUND OF THE INVENTION

The present invention relates to digital electronic readouts and other systems in which a function to be measured, $F(x)$, is tracked and measured by a measuring function, $F(y)$, where $F(x)$ and $F(y)$ undergo varying conditions of change.

One prior art system in which one function measures another function is described in the above-referenced application, Ser. No. 864,079. In that system, a digital sine/cosine generator (DSCG) produces an electrical signal, $F(y)$, which, in a typical digital readout embodiment, tracks and is a measure of the space position, $F(x)$, of an Inductosyn transducer. In that readout embodiment, the $F(y)$ electrical signal lags the space position, $F(x)$, except when the error signal from the Inductosyn transducer is low. This lag signifies that $F(y)$ has a positional error with respect to $F(x)$.

The above-referenced prior art system measures position on a digital basis where each digital bit represents one unit of measure (e.g., one bit represents $1 \times 10^{-4}$ in.). Typically, that system has no positional error and is accurate to a resolution of one bit if the space position $F(x)$ is not changing or is changing with a low velocity. When, however, $F(x)$ has a velocity, $dF(x)/dt$, which exceeds a threshold such as 500 bits per second, the electrical signal $F(y)$ lags the space position $F(x)$ as a function of $F(x)$'s velocity. For $F(x)$ having a velocity in the neighborhood of $5 \times 10^5$ bits per second (e.g., moving the two members of an Inductosyn transducer relative to each other at 50 inches/sec), $F(y)$ may lag $F(x)$ by several hundred bits.

One example of where a velocity-caused lag problem may occur is in a machine tool inspection machine employed to measure, on the fly, the contour of a surface. As the measuring probe is moved over the surface, a computer or other readout device records digital numbers representing $F(y)$ as a measurement of the probe positions, $F(x)$. Under these measuring conditions, the to-be-measured space position $F(x)$ undergoes a velocity, $dF(x)/dt$, which is relatively high when the measuring probe is moving rapidly over the surface. If the measuring function $F(y)$ lags behind $F(x)$, the reading of $F(y)$ by the computer is undesirably an incorrect measurement of the actual position $F(x)$.

In view of the above background, it is an object of the present invention to overcome the velocity limitations of prior art systems by providing a high-speed digital tracking system which is capable of tracking and measuring with high accuracy when $F(x)$ is static and when $F(x)$ undergoes high or low velocities and accelerations.

SUMMARY OF THE INVENTION

The present invention is a high-speed tracking system, typically employed to form a digital readout system, in which to-be-measured function $F(x)$ (e.g., space position) is tracked and measured by a measuring function $F(y)$ (e.g., electrical signal).

A characteristic of the to-be-measured function $F(x)$ is that it exhibits rapid changes, that is, exhibits velocities $dF(x)/dt$ and/or accelerations $d^2F(x)/dt^2$. To insure that $F(y)$ accurately tracks $F(x)$ when $F(x)$ is exhibiting rapid changes, it is desirable, in accordance with the present invention, that $F(y)$ be made to undergo variations which match those of $F(x)$.

In order to match the variations of $F(y)$ to those of $F(x)$, $F(y)$ exhibits an acceleration $d^2F(y)/dt^2$ which by system design at least exceeds any acceleration $d^2F(x)/dt^2$ of $F(x)$ which is to be encountered. The measuring function $F(y)$ is then derived by two controlled integrations of $d^2F(y)/dt^2$ where the first integration produces the velocity $dF(y)/dt$ of $F(y)$ and where the second integration produces $F(y)$ itself.

The function $F(y)$ thus produced by the two integrations tracks and is an accurate measure of the $F(x)$ function. Additionally, the velocity $dF(x)/dt$ of $F(x)$ is tracked by the velocity $dF(y)/dt$ of $F(y)$. The present invention is, therefore, a second order servo system in which both the velocity and position of the measuring function $F(y)$ track the velocity and position of the to-be-measured function $F(x)$.

In a specific embodiment of the present invention, the first integration of the acceleration signal $d^2F(y)/dt^2$ is carried out in a tracking control means. In a typical example, the acceleration signal is defined to have a constant magnitude, such as represented by the pulse frequency of a constant frequency pulse train, but to have a sign, positive or negative, which is controllable by an error signal as described below.

The tracking control means typically includes a first digital counter, called herein the velocity counter, for carrying out the first integration. The velocity counter counts the pulses in the acceleration signal pulse train in a positive or negative direction so that the accumulated count in the velocity counter represents the velocity magnitude which has either a positive or negative sign. That velocity magnitude is employed to generate the velocity signal $dF(y)/dt$ typically in the form of a second pulse train having a pulse frequency proportional to the count in the velocity counter. The sign of the velocity signal is positive or negative as determined by the algebraic sum of the acceleration pulses.

In order to control the direction of the first integration, that is to select the sign of the acceleration signal, both the measuring function $F(y)$ and the to-be-measured function $F(x)$ are compared in a comparing device, such as an Inductosyn transducer, to produce an error signal $F(x,y)$ as a function of the difference between $F(x)$ and $F(y)$.

A control signal generator accepts the error signal and generates a control signal which controls the direction of counting of the velocity counter. That control signal is derived by threshold detecting an analog signal proportional to the sum of one term which is the error signal $F(x,y)$ and another term which is one-half the sum of the error signal's first derivative and the error signal's first derivative squared. The significance of these terms is explained hereinafter.

The second one of the two integrations is performed on the velocity signal $dF(y)/dt$ to form the desired measuring function $F(y)$. That second integration is again typically carried out by a second counting apparatus which counts the pulses in the second pulse train in a positive or negative direction controlled by the sign of the count in the velocity counter. The measuring function $F(y)$ is dynamically stored in the second counting apparatus and, after suitable conversion, is applied to the comparing device as previously indicated. $F(y)$ together with the to-be-measured function $F(x)$ determine the error signal output from the comparing device.

A further feature of the invention includes selecting outputs from the frequency counter in either a linear or non-linear fashion so that changes in the velocity signal $dF(y)/dt$ may be made linear or non-linear with respect to changes in the count in the velocity counter.

Another feature includes the synchronous strobing of the error signal, and other signals, to form a synchronous digital system. A still additional feature of the present invention is the use of a variable acceleration signal as an input to the velocity counter in order that the measuring acceleration $d^2F(y)/dt^2$ tracks the acceleration $d^2F(x)/dt^2$ of the to-be-measured function $F(x)$.

As an additional feature, the velocity tracking control means is employed in an open loop position control system where a commanded velocity is read into the velocity counter thereby causing the $dF(y)/dt$ signal to have a constant frequency which in turn is employed to develop an error signal in an Inductosyn transducer. That error signal is then used to drive a position control, such as a motor, until the error signal is zero.

DETAILED DESCRIPTION

General

Figure 1:
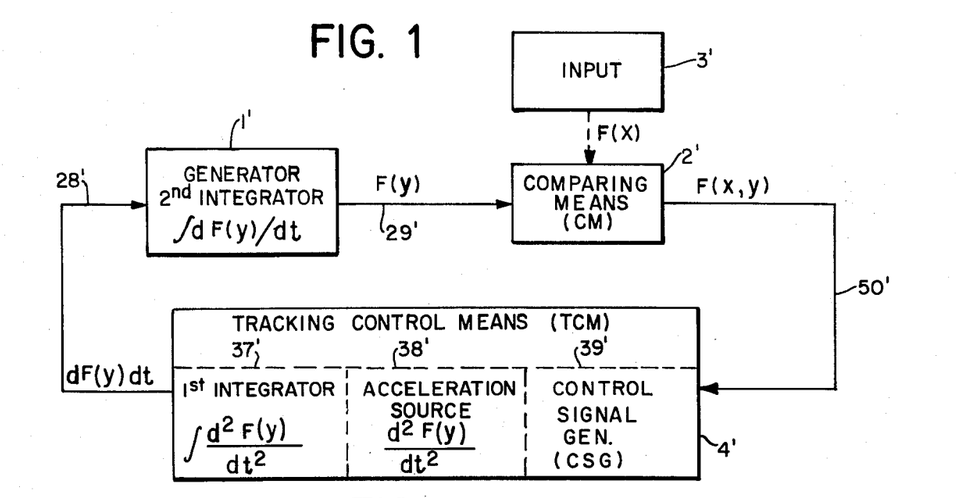
FIG. 1 depicts a general block diagram of an apparatus in accordance with the present invention in which a function $F(x)$ is measured by a function $F(y)$.

FIG. 1 depicts a block diagram of a high-speed digital tracking system which includes a comparing means (CM) 2' which is typically an Inductosyn transducer and associated circuitry. Comparing means 2' generates an error signal, $F(x,y)$, as a function of two input functions, $F(x)$ and $F(y)$. The $F(x)$ function is received from input 3' which is typically the relative space position, $x$, of two relatively movable members of an Inductosyn transducer. $F(x)$ typically exhibits a velocity variation $dF(x)/dt$ and an acceleration variation $d^2F(x)/dt^2$. The other input, $F(y)$, is derived from the double integration of an acceleration signal $d^2F(y)/dt^2$ where, after the two integrations, $F(y)$ is typically an electrical angle $y$ in the form of a digital count which is typically converted to analog electrical signals (e.g., sin $y$ and cos $y$) suitable as inputs to an Inductosyn transducer.

The first integration performed to produce $F(y)$ is carried out in a tracking control means 4'. Tracking control means 4' functionally includes a source 38' for supplying a constant magnitude acceleration signal $d^2F(y)/dt^2$, a first integrator and control 37' for integrating said acceleration signal to produce a velocity signal $dF(y)/dt$, and a control signal generator 39' for controlling the direction of integration of the first integrator. Tracking control means 4' produces the velocity signal $dF(y)/$under control of the error signal $F(x,y)$.

The second integration performed to produce $F(y)$ is carried out in a second integrator 1' which is typically a digital sin/cos generator (DSCG). The integrator 1' generates the function $F(y)$ by integrating the velocity signal $dF(y)/dt$ after deriving that velocity signal from the tracking control means 4'.

The FIG. 1 system operates to maintain the error signal $F(x,y)$ at a small value thereby insuring that the measuring function F(y) tracks the to-be-measured function $F(x)$ accurately. Since $F(x)$ typically undergoes high velocities and accelerations, $F(y)$ is also rendered, in accordance with the present invention, able to match those high velocities and accelerations.

While measurement of $F(x)$ is a primary purpose of the present invention and hence $F(y)$ must accurately track $F(x)$, $dF(y)/dt$ is also made to track $dF(x)/dt$. More specifically, the present invention simultaneously employs positional servoing ($F(y)$ tracking $F(x)$) and velocity servoing ($dF(y)/dt$ tracking $dF(x)/$). With those two levels of tracking, position and velocity, a second order system results. In addition to second order systems, the present invention also embodies third and higher order systems. In a third order system, for example, besides position and velocity tracking, acceleration tracking ($d^2F()/dt^2$ tracking $d^2F(x)/dt^2$) may be provided by a triple integration operation analogous to the double integration operation of the above-described second-order system. The drawings do not show a third-order system.

Digital Readout

Figure 2:
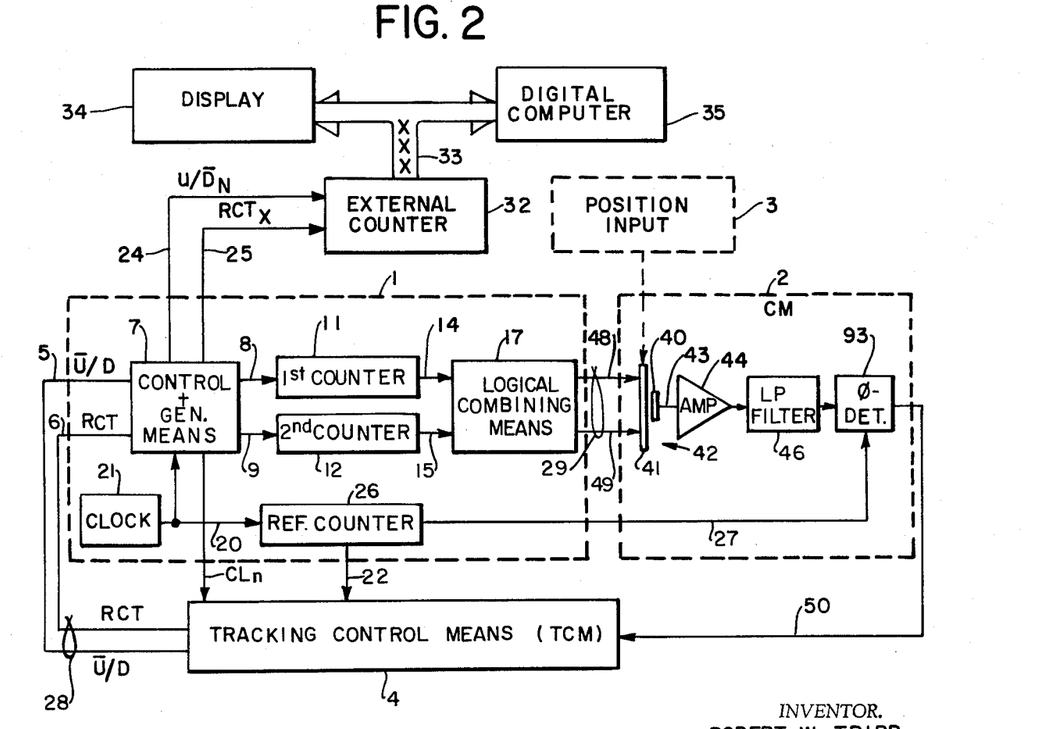
FIG. 2 depicts a general block diagram in which the measuring apparatus on FIG. 1 is organized into a digital readout system for digitally reading out the measuring function F(y) as a measurement of the to-be-measured function $F(x)$, the latter of which is in the form of the space position of an Inductosyn transducer.

Referring to FIG. 2, a specific digital readout embodiment of a high speed tracking system with position and velocity servoing is shown. The digital output, representing $F(y)$ is provided as a signal on bus 33. That signal on bus 33 is supplied to a display 34 and to computer 35 or other suitable device (not shown) to indicate or store the measured position of two relatively movable members of Inductosyn transducer 42. Specifically, a position input 3 is provided by the manual or power-driven positioning of the relatively movable members 40 and 41 of Inductosyn transducer 42 causing the transducer to have a relative space position $x$.

Position input 3 in a typical example is a probe (not shown) on a machine tool inspection machine. In operation, for example, the probe representing position input 3 is rigidly connected to the movable member of Inductosyn transducer 42. As the probe is moved, the Inductosyn transducer movable member simultaneously moves and causes the apparatus of FIG. 2 to digitally display in display 34 the position of the probe. While the position input 3 has been described in terms of a probe moving in one axis, that probe may, of course, be employed to measure movements along two or more axes. For each axis of movement which is to be measured, a separate system like that of FIG. 2 is employed. For a 3-axis system, for example, three Inductosyn transducers and three systems like that of FIG. 2 are employed.

The apparatus of FIG. 2 measures the position $x$ by means of an electrical angle $y$, a digital representation of which is recorded in counter 32. Connected, in a conventional manner, to Inductosyn transducer 42 are a conventional amplifier 44, filter 46, and phase detector 93 for receiving the transducer output on line 43 and delivering a properly detected error signal on line 50. The transducer 42, amplifier 44, filter 46, and phase detector 93 are all standard components which form, in FIG. 2, a comparing means 2 equivalent to the comparing means 2' of FIG. 1. Typically, sin $y$ and cos $y$ signals defining the electrical angle $y$ are applied as the measuring function $F(y)$ to transducer 42 via input lines 48 and 49, respectively. The sine and cosine signals on lines 48 and 49 are derived from a digital sine/cosine generator 1. The generator 1 is an embodiment of integrator 1' of FIG. 1. Specific details of a typical generator 1 appear in the above-referenced patent application, Ser. No. 864,079. A preferred embodiment of generator 1 is described hereinafter in connection with FIGS. 8a and 8b.

Briefly, with reference to FIG. 2, generator 1 receives on lines 5 and 6 input information in the form of a direction signal ($\overline{U}/D$) and magnitude signal RCT in the form of a pulse train having a pulse frequency, respectively, which together define the velocity signal $dF(y)/dt$.

The function of generator 1 is to algebraically count the pulses in that RCT pulse train and thereby accumulate and store a running digital count which represents the electrical measurement function $F(y)$. Generator 1 converts that digital count to analog signals suitable as inputs to an Inductosyn transducer as described above. Thus, analog signals input to the Inductosyn transducer along with the to-be-measured function $F(x)$ together generate the error signal. That error signal is then employed to generate pulses which alter the count accumulated in the generator 1 in a direction which tends to reduce the error signal to a zero level. The number of pulses thus generated is a measure of the change in the Inductosyn transducer position. Such an operation is basically that of a servo system in which the electrical measuring function $F(y)$ tracks the to-be-measured space function $F(x)$. The number of pulses employed to change $F(y)$ is counted, stored, and displayed or otherwise read out to give a measure of position.

In generator 1, control and generation means 7 receives the input information on lines 5 and 6, as well as a clock signal on line 20. Generation and control means 7 causes a first bi-directional counter, consisting of first counter 11 and second counter 12, to be stepped in synchronism by pulses on line 20 from clock 21 in the absence of velocity signal pulses on line 6. When pulses are received on line 6, control and generation means 7 causes the difference in count between counters 11 and 12 to change by one count for each pulse received. The difference in count between counter 11 and 12 defines a number which is the integration of the velocity signal $dF(y)/dt$ and hence that number represents $F(y)$. The output signals on lines 14 and 15, from counters 11 and 12, respectively, are supplied to a logical combining means 17 which responsively produces pulse-width modulated signals on lines 48 and 49. Counters 11 and 12 are designed with a total count range ($N/2$) (e.g., 1,000) and exhibit a count difference $y$ where $y$ is a number between 0 and $N$. The pulse-width modulated signals on lines 48 and 49 include, therefore, a fundamental frequency component having an amplitude proportional to sin $\phi$ and cos $\phi$, respectively, where $\phi = (y/N)(360°)$.

Generator 1 in FIG. 2 also includes a reference counter 26 which counts down the clock signal on line 20 to produce a reference on line 27 which is employed in the phase detector 93. Additionally, the reference counter supplies, as a count down of the clock signal on line 20, a timing signal on line 22 which is connected to the tracking control means 4.

An additional function of the generation and control means 7 of FIG. 2 is to supply a velocity magnitude signal on line 25 to an external counter 32 where the line 25 signal is substantially the same as the line 6 signal except for the inhibiting of one bit oscillations in the line 25 signal. Such a feature is disclosed and claimed in the above-referenced Ser. No. 814,670 application. External counter 32 is a conventional counter which counts the pulses on line 25 in a direction controlled by the $U/\bar{D}_n$ signal on line 24 derived from the $\bar{U}/D$ signal on line 5. External counter 32 stores, therefore, a count representing the function $F(y)$ which, as described, is equal to the electrical signal $y$. External counter 32 has a parallel bus 33 for delivering an output digital signal to a conventional display 34, a digital computer 35 or other output device (not shown).

Because the electrical signals representing the measuring function $F(y)$ on lines 48 and 49 from generator 1 are pulse-width modulated signals which are modulated at a fundamental frequency, typically $2 \times 10^3$Hz, the error signal on line 43 from the Inductosyn transducer 42 is an amplitude modulated AC signal where the frequency of modulation includes the same fundamental as the signals on lines 48 and 49. In addition to the fundamental frequency, higher order harmonic frequencies are typically present on line 43, which are removed in low-pass filter 46, which typically has a characteristic which removes second and higher order harmonics. The output from filter 46 is, therefore, principally the fundamental frequency amplitude modulated as a function of the difference between the $F(y)$ and $F(x)$ inputs. Phase detector 93 is operated with a sampling input on line 27 occurring at the fundamental frequency. The output signal of line 50 is, therefore, a DC level which varies as a function of the difference between the $F(x)$ and $F(y)$ inputs to Inductosyn transducer 42.

TRACKING CONTROL MEANS (TCM)

Figure 3:
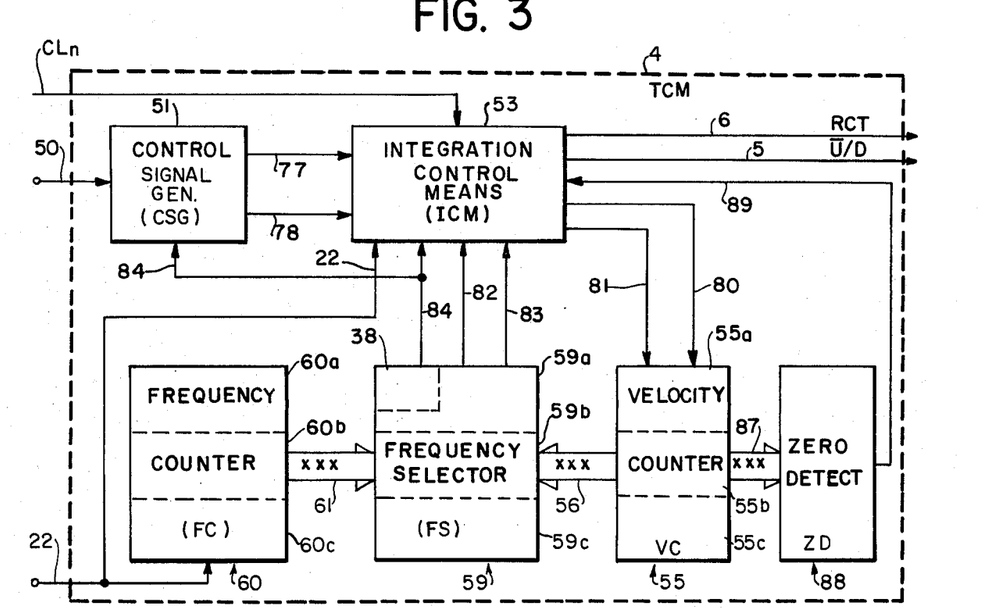
FIG. 3 depicts, in block diagram form, the tracking control means of the FIG. 1 and FIG. 2 systems.

Referring to FIG. 3, a block diagram of the tracking control means 4' and 4 of FIGS. 1 and 2, respectively, is shown. The tracking control means 4 in FIG. 3 includes an error signal input on line 50, a clock input on line 22, a clear input $CL_n$, an up/down ($\bar{U}/D$) output on line 5, and a velocity magnitude output on line 6, all corresponding to the identically numbered input and output lines of the tracking control means 4 of FIG. 2.

In FIG. 3, the error signal $F(x,y)$, input on line 50 is supplied to a control signal generator (CSG) 51. The control signal generator 51 is described in further detail hereinafter in connection with FIG. 4. Briefly, in FIG. 3, generator 51 delivers complementary binary 1 and 0 signals via lines 77 and 78 to integration control means (ICM) 53. Similarly, generator 51 receives a timing signal on line 84 from frequency selector 59. In operation, control signal generator 51 operates on the error signal from line 50 to perform the operations which provide an analog signal, $\overline{CS}$, as present on line 109 (see FIG. 4 description below) as follows:

$$\overline{CS} = F(x, y) + (\tfrac{1}{2})\left[dF(x,y)/dt + \frac{dF(x,y)/dt}{|dF(x,y)/dt|}(dF(x,y/dt)^2\right]$$

Eq. (1)

The other input to tracking control means 4 of FIG. 3 is a timing signal on line 22 supplied to a frequency counter (FC) 60 and to the integration control means (ICM) 53. Frequency counter 60, in a particular embodiment, is comprised of three decade stages 60a, 60b, and 60c which together give frequency counter 60 a count range of 1,000. Frequency counter 60 is constructed of conventional stages well known to those skilled in the art. The outputs from each of the stages of each decade of counter 60 form a bus 61 connected to a frequency selector (FS) 59. Frequency selector 59 has stages 59a, 59b, and 59c corresponding to the counter stages 60a, 60b and 60c, respectively. Frequency selector 59 includes as part of stage 59a an acceleration source 38 which selects a first pulse train from frequency counter 60 where the frequency of that pulse train defines the magnitude of the acceleration signal $d^2F(y)/dt^2$. That acceleration signal on line 84 is applied through integration control means (ICM) 53 to a velocity counter 55 via either line 80 or line 81. Integration control means 53 selects line 80 when the acceleration signal on line 84 is to cause counter 55 to count up and selects line 81 when the acceleration signal on line 84 is to cause counter 55 to count down.

Velocity counter 55 of FIG. 3 performs the first integration functionally indicated by first integrator 37' of FIG. 1. In FIG. 3, velocity counter 55 includes three decade stages 55a, 55b, and 55c which are conventional and well known to those skilled in the art. The stages 55a, 55b, and 55c have outputs which collectively form bus 56 connected to the corresponding stages 59a, 59b, and 59c of the frequency selector 59. Since the operation of the velocity counter 55 is to integrate the acceleration signal $d^2F(y)/dt^2$ on line 84, the count stored in counter 55 represents the magnitude of a velocity signal $dF(y)/$That count as it appears on the bus 56 is decoded in frequency selector 59 causing selector 59 to select appropriate output stages from counter 60 and provide on bus 61 output pulses which form a pulse train on line 83 where the frequency of that pulse train represents the count stored in velocity counter 55. More specifically, the frequency of pulses of the pulse train on line 83 represents the magnitude of the velocity signal $dF(y)/dt$. Line 83 is connected through integration control means 53 to line 6 so that the magnitude of the velocity signal is defined by the pulse frequency of a pulse train as it appears on line 6. That pulse train on line 6 is frequently referenced hereinafter as the second pulse train. The direction (polarity) of the velocity signal is defined by the binary 1 or 0 level of the $\bar{U}/D$ signal on line 5.

Integration control means 53 controls the direction of integration of velocity counter 55 (by selecting either line 80 or 81) and the positive or negative nature of the velocity signal on lines 5 and 6 (by controlling the 1 or 0 level of line 5) in response to the control signal generator inputs on lines 77 and 78 and in response to a zero detect signal on line 89 where the latter is derived from a zero detector 88. Zero detector 88 is connected to velocity counter 55 by a bus 87 and is operative to detect when the counter 55 stores a zero count.

Further details of the tracking control means 4 of FIG. 3 are described hereinafter in connection with FIG. 4 and FIG. 5.

CSG Detail

Figure 4:
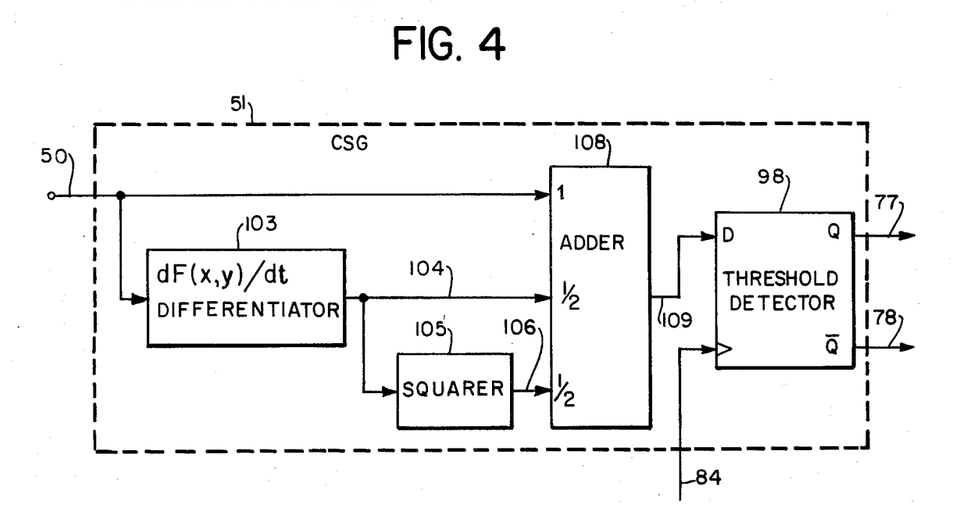
FIG. 4 depicts, in block diagram form, further details of a control signal generator employed within the tracking control means of FIG. 3.

In FIG. 4, the control signal generator (CSG) 51 is one embodiment of the like-numbered generator of FIG. 3 and the control signal generator 39' of FIG. 1. Generator 51 receives the error signal $F(x,y)$ on input line 50, typically a signal in the form of $\sin(y-x)$ where $y$ is the electrical angle defined by generator 1 and $x$ is the space angle defined by transducer 42 of FIG. 2. That $\sin(y-x)$ signal is differentiated in differentiator 103 to form a differentiated error signal $(dy/dt - dx/dt)\cos(yx)$ on line 104. Differentiator 103 is a standard device well known to those skilled in the art. Typically, differentiator 103 is an operational amplifier fed by input capacitor and resistor elements (not shown). The differentiated signal on line 104 is applied to squarer 105 which forms the squared differentiated signal $((dy/dt - dx/dt)\cos(y-x))^2$. Squarer 105 is a conventional device well known to those skilled in the art. Squarer 105 may be implemented, for example, as a pair of anti-parallel diodes (not shown) which exhibit a square law transfer characteristic. The error signal on line 50, the differentiated error signal on line 104, and the squared differentiated error signal on line 106 are all supplied as inputs to adder 108, which functions to form on line 109 an analog signal, $\overline{CS}$, of the form previously described in connection with Equation (1) above. Specifically, the analog signal $\overline{CS}$ is obtained by substituting $\sin(y-x)$ for the error signal $F(x,y)$ in Equation (1) as follows:

$$\overline{CS} = \sin(y-x) + \tfrac{1}{2}\left[(dy/dt - dx/dt)\cos(y-x) + \frac{(dy/dt-dx/dt)\cos(y-x)}{|(dy/dt-dx/dt)\cos(y-x)|}[dy/dt - dx/dt)\cos(y-x)]^2\right]$$

Eq. (2)

Adder 108 is a conventional device for summing the three analog inputs on lines 50, 104, and 106. Note that, in order to properly weight the respective inputs, adder 108 typically multiplies the input on line 50 by a factor of one, and the inputs on lines 104 and 106 each by a factor of one-half.

Equation (2) above includes three terms. The first term, $\sin(y-x)$, serves the function of indicating the positional error of $F(y)$ with respect to $F(x)$. When $y$ equals $x$, then the first term is zero. when $y$ does not equal $x$, then the first term contributes some magnitude to the signal $\overline{CS}$. The second term, $(\tfrac{1}{2})(dy/dt - dx/dt)\cos(y-x)$, has the function of adding a stability term to the signal $\overline{CS}$ which assures that the servoing operation is stable and does not oscillate (other than one bit oscillations at null) or does not otherwise break down.

The third term, $$(\tfrac{1}{2})\left[\frac{(dy/dt-dx/dt)\cos(y-x)}{|(dy/dt-dx/dt)\cos(y-x)|}\right][(dy/dt-dx/dt)\cos(y-x)]^2$$

the response speed of the system, particularly for accelerations applied in the form of impulses. The inclusion of the third term is not mandatory for stable operation and need not be employed to practice the present invention. Without the third term, the (½) factor would be dropped from the second term.

In evaluating Equation (2), the value of $\cos(y-x)$ may be generally considered as unity, since the present system is designed to keep $y$ within a very small value of $x$, and for values of angles near zero the cosine function is approximately unity. The second term is, therefore, merely a measure of the difference in velocities between $F(x)$ and $F(y)$ functions. Similarly, the third term is merely the square of the difference in velocities of the $F(x)$ and $F(y)$ functions where the sign is not lost by the squaring operation as assured by the factor in the third term having the absolute value in the denominator and the signed value in the numerator. The absolute value factor is denoted by the verticle lines.

The analog signal on line 109 is threshold detected in a threshold detector 98 to form binary 1 and 0 signals on lines 77 and 78. The threshold detector 98 may be any conventional device and is shown in FIG. 4 as a D-type flip-flop where the analog signal on line 109 is connected to the D input. A timing signal input is applied to the clock input of detector 98 by line 84. Whenever line 109 is above a zero voltage when a positive-going timing pulse appears on line 84, the Q output on line 77 is a 1 and the $\overline{Q}$ output on line 78 is a 0. Whenever the signal level is below the zero voltage on line 109 when a timing pulse appears on line 84, the Q output on line 77 is switched to a 0 and the $\overline{Q}$ output on line 78 is switched to a 1. The timing pulses on line 84 are derived from the frequency selector 59 of FIG. 3 as hereinafter described in connection with FIGS. 5a and 5b.

Counters and Frequency Selector (FS)

Figure 5A:
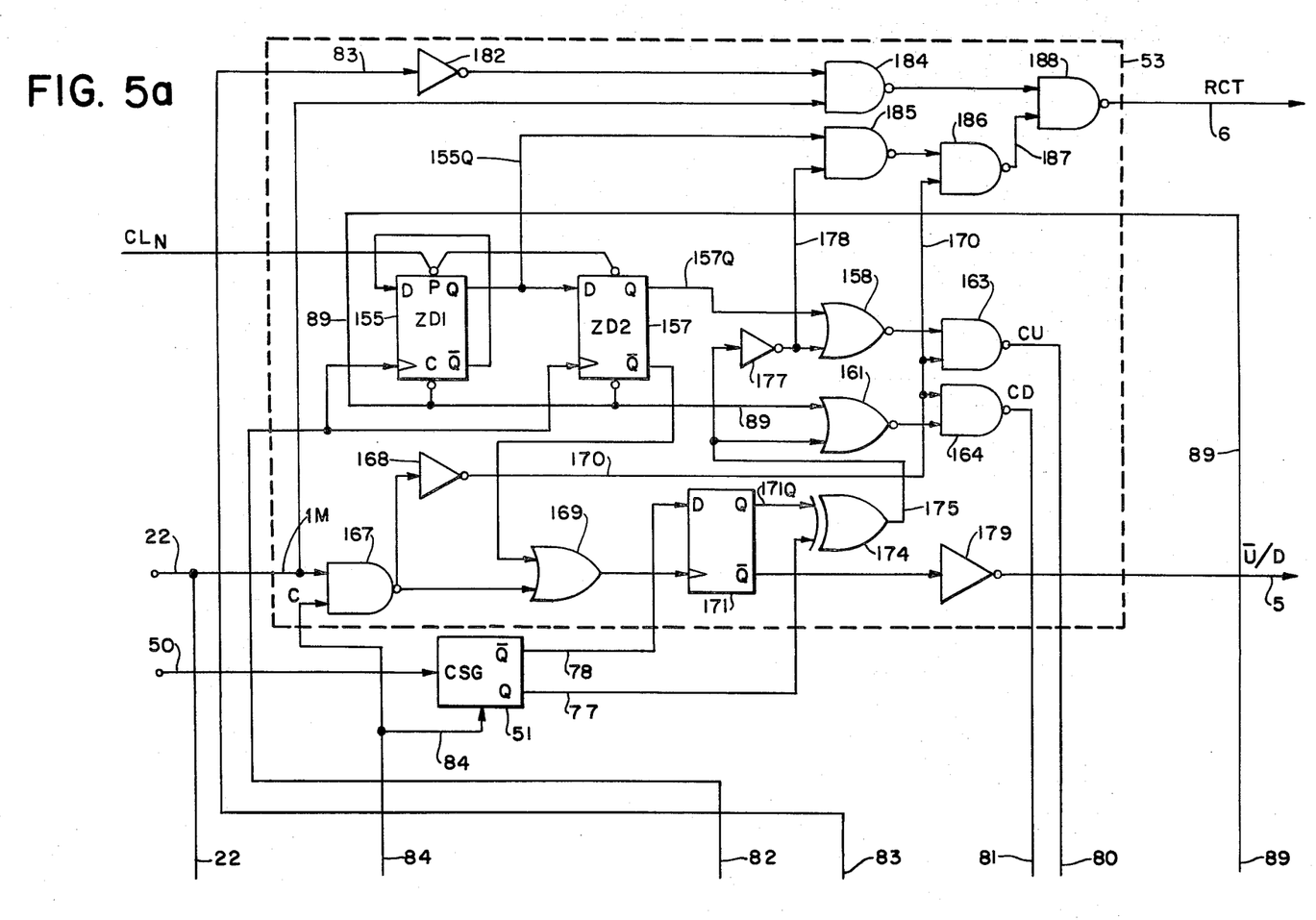
FIGS. 5a and 5b depict further details of the FIG. 3 tracking control means.
Figure 5B:
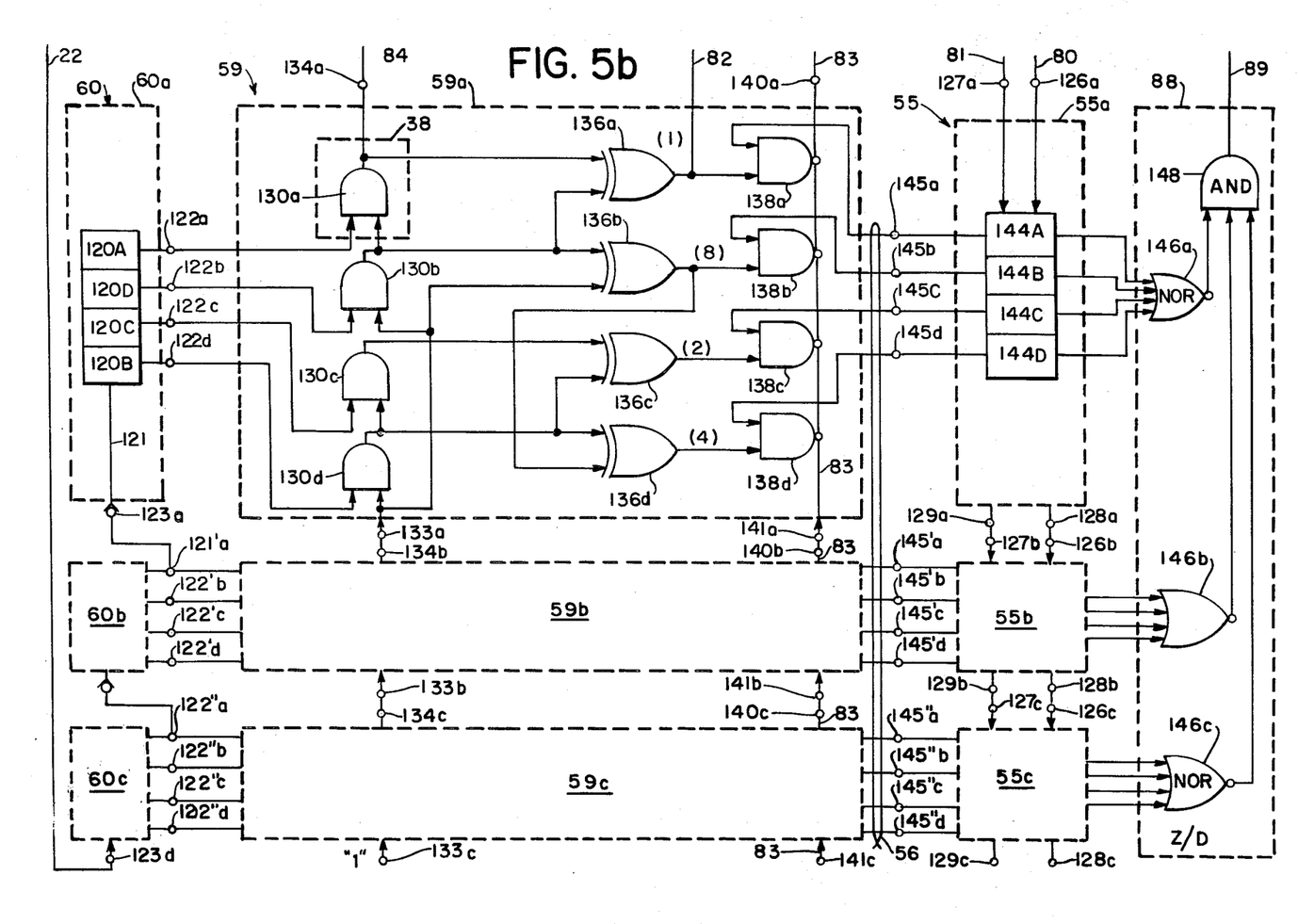

FIGS. 5a and 5b depict further details of the tracking control means 4 of FIG. 3. The control signal generator 51 in FIG. 5a is like that described in connection with FIG. 4. Also in FIG. 5b the frequency counter 60 of FIG. 3 is shown constituted by decade stages 60a, 60b, and 60c. Further stage 60a itself in FIG. 5b is constituted by a conventional VCD decade counter well known to those skilled in the art. Stage 60a includes stages 120A, 120D, 120C and 120B which render 1 and/or 0 outputs at terminals 122a, 122b, 122c and 122d, respectively. Counter stage 60a receives and counts input pulses on line 121 via terminal 123a. Counter stages 60b and 60c are identical to counter stage 60a and are for simplicity shown in schematic form. The input terminal 123a of stage 60a is derived from the lowest order output 124a of the stage 60b. The output 122'a of stage 60b is analogous to the lowest order output 122a of stage 60a. In a similar manner, the output 122"a of stage 60c is connected to the terminal 123b of stage 60b. The timing signal on line 22 serves as the input to terminal 123c of stage 60c so that counter stages 60c, 60b and 60a count the pulses received on line 22. While decade counter 60a includes decade stages 120A, 120D, 120C and 120B, both the stages 60b and 60c also typically include stages corresponding to those of the decade counter 60a. While decade counter stage 60a renders its outputs at terminals 122a, 122b, 122c and 122d, stages 60b and 60c, in an analogous manner, render outputs at terminals 122'a through 122'd and 122"a through 122"d, respectively.

Referring to counter stage 60a, terminals 122a through 122d are connected as inputs to AND gates 130a through 130d, respectively. AND gate 130d receives one input from terminal 133a and its output serves as an input to AND gate 130c, to EXCLUSIVE-OR gate 136d and to EXCLUSIVE-OR gate 136c. AND gate 130c has its output connected as the other input to EXCLUSIVE-OR gate 136c. AND gate 130b receives an input, in addition to the input from terminal 122b, from terminal 133a and delivers its output to AND gate 130a and to EXCLUSIVE-OR gates 136a and 136b. AND gate 130a provides its output to EXCLUSIVE-OR gate 136a and to terminal 134a. EXCLUSIVE-OR gates 136a, 136b, 136c and 136d each have their outputs connected as inputs to NAND gates 138a, 138b, 138c and 138d, respectively. Also, EXCLUSIVE-OR gate 136b has its output connected as an input to EXCLUSIVE-OR gate 136d.

NAND gates 138a, 138b, 138c and 138d each receive inputs from terminals 145a, 145b, 145c and 145d, respectively, where those terminals are connected to receive the outputs from stages 144A, 144B, 144C and 144D, respectively, of velocity counter stage 55a. The outputs from NAND gates 138a through 138d are tied in common by line 83 which has an input terminal 141a and an output terminal 140a.

The frequency selector stage 59a, shown in detail in FIG. 5b, is identically duplicated in stages 59b and 59c where the input terminals 133a and 141a and output terminals 134a and 140a have counterparts in input terminals 133b and 141b and output terminals 134b and 140b for stage 59b, respectively, and input terminals 133c and 141c and output terminals 134c and 140c for stage 59c, respectively. Similarly, velocity counter 55a is identically duplicated in stages 55b and 55c. Specifically, input terminals 127a and 126a and output terminals 129a and 128a for stage 55a find their correspondence in input terminals 127b and 126b and output terminals 129b and 128b for stage 55b, respectively, and input terminals 127c and 126c and output terminals 129c and 128c for stage 55c, respectively.

To further explain the details of the frequency selector 59 and its cooperation with the velocity counter 55 and frequency counter 60, an explanation of the interaction of stages 55a, 59a, and 60a is helpful. In that explanation, reference to the following CHART I is made:

CHART I

| Box A—Frequency Counter Stage 60a | | | | Box B—EXCLUSIVE-OR's 136a-136d | | | |
|---|---|---|---|---|---|---|---|
| A (5) | D (4) | C (2) | B (1) | (8) | (4) | (2) | (1) |
| 0 | 0 | 0 | 0 | 1 | 1 | 0 | 0 |
| 0 | 0 | 0 | 1 | 1 | 0 | 1 | 0 |
| 0 | 0 | 1 | 0 | 1 | 1 | 0 | 0 |
| 0 | 0 | 1 | 1 | 1 | 0 | 0 | 0 |
| 0 | 1 | 0 | 0 | 0 | 0 | 0 | 1 |
| 1 | 0 | 0 | 0 | 1 | 1 | 0 | 0 |
| 1 | 0 | 0 | 1 | 1 | 0 | 1 | 0 |
| 1 | 0 | 1 | 0 | 1 | 1 | 0 | 0 |
| 1 | 0 | 1 | 1 | 1 | 0 | 0 | 0 |
| 1 | 1 | 0 | 0 | 0 | 0 | 0 | 0 |

In Box A, the counting sequence of stage 60a is shown. When stage 60a is reset by conventional reset means (not shown) to zero count, stages ABCD contain 0000 at terminals 122a through 122d as indicated by the top entry of Box A. For each pulse received on line 121 via terminal 123a from the higher order stage 60b, counter stage 60a counts in a quibinary fashion as indicated by Box A. For the first count received, counter stages ABCD are 0001. After nine input pulses, those stages are 1100. The tenth pulse returns the stages to 0000. Such counting operation is standard and well known to those skilled in the art.

In response to the counting of stage 60a, the AND gates 130a through 130d and the EXCLUSIVE-OR gates 136a through 136d are operative to generate output pulses. EXCLUSIVE-OR gates 136a, 136b, 136c, 136d have their outputs identified by their weighted values (1), (8), (2), (4), respectively.

For a standard operation in which stage 60a is cycled from its zero count 0000 to its nine count 1100 with an input 1 at terminal 133a, EXCLUSIVE-OR gate 136a delivers one output pulse on output (1). Similarly during that cycle, the EXCLUSIVE-OR gate 136b output (8) delivers eight output pulses, the EXCLUSIVE-OR gate 136 output (2) delivers two output pulses, and the EXCLUSIVE-OR gate 136d output (4) delivers four output pulses.

The function of the input signal on line 133a is to detect when counter stages 60b and 60c of the frequency counter 60 are each at the nine's count (1100). Similarly, a 1 on line 84 at terminal 134a indicates that all stages 60a, 60b, and 60c of counter 60 are at the nine's count. Since counter 60c and frequency selector stage 59c are the first stages, the input on line 133c is tied to a 1. Since in one preferred embodiment each of the stages 60a, 60b, and 60c is a decade counter, the total count represented by those stages is 1000 (0 to 999).

The NAND gates 138a through 138d function to select output pulses from the (1), (8), (2), and (4) lines to form a pulse train on line 83 as a function of the count in counter stage 55a. In an analogous manner, velocity counter stages 55b and 55c have counts which control the generation of output pulses from frequency selector stages 59b and 59c, respectively, to add additional output pulses to line 83. Further details of the operation of the output pulse selection are given in connection with the following CHART II:

CHART II

| Box A Velocity COUNTER stage 55a | | | | | Box B No. of line 83 output pulses | | | | No. of line 187 pulses |
|---|---|---|---|---|---|---|---|---|---|
| D (8) | C (4) | B (2) | A (1) | Weight | 8 | 4 | 2 | 1 | 1 |
| 0 | 0 | 0 | 0 | 0 | | | | | |
| 0 | 0 | 0 | 0 | 1 | | | | | |
| 0 | 0 | 0 | 1 | 2 | | | | X | X |
| 0 | 0 | 1 | 0 | 3 | | | X | | X |
| 0 | 0 | 1 | 1 | 4 | | | X | X | X |
| 0 | 1 | 0 | 0 | 5 | | X | | | X |
| 0 | 1 | 0 | 1 | 6 | | X | | X | X |
| 0 | 1 | 1 | 0 | 7 | | X | X | | X |
| 0 | 1 | 1 | 1 | 8 | | X | X | X | X |
| 1 | 0 | 0 | 0 | 9 | X | | | | X |
| 1 | 0 | 0 | 1 | 10 | X | | | X | X |

In CHART II, Box A identifies the counting sequence of velocity counter stage 55a and the weight associated with each count. As indicated, stage 55a counts in a normal binary fashion between the zero count 0000 and the nine count 1001 (weighted 10). As indicated in Box B, the number of output pulses selected to form the pulse train on line 83, which, when added to any pulse on line 184, form the second pulse train on line 6. For example, when stage 55a has a 0000 count, no output pulses appear on line 83 during a cycle of counter stage 60a. When stage 55a has a count 0101 weighted 6, then NAND gates 138d and 138a are energized to select a total of five output pulses on line 83, as indicated by the X(s) in the (4) and (1) columns of Box B. The sixth pulse is derived from line 187 to form six pulses on line 6 during 1 cycle of frequency counter 60.

For counts in velocity counter 55 greater than those from 0 to 9 (weighted 0 to 10), stages 55b and 55c record the higher order counts. For example, a count of 11 (weight 12) is counted into counter 55 by 11 stepping pulses appearing on line 80. After the first nine pulses, stage 55a has a count 1001. The tenth pulse on line 80 causes counter stage 55a to reset to all 0's with a carry signal through terminals 128a and 126b propagated to the stage 55b. In stage 55b, that carry pulse sets a first stage (not shown) corresponding to stage 144A to a 1. Thereafter, the eleventh pulse on line 80 sets counter stage 144A to a 1, thereby indicating a total of 11 counts in counter 55. The operation of the frequency selector 59 in response to an eleven count in velocity counter 55 can be understood with reference to a full cycle of the frequency counter 60.

As previously indicated, frequency counter stage 60c receives input pulses of a constant frequency on line 22 and counts up to nine and resets on the 10 pulse, thereby transmitting a carry signal to stage 60b through terminals 122"a and 123b. Accordingly, counter stage 60c cycles once for each single count of stage 60b. For each carry output via terminals 122'a and 123a, to stage 60a, stage 60c cycles 10 times and stage 60b cycles one time. Similarly, for each carry out on line 122a, counter 60b cycles 10 times, and, therefore, stage 60c cycles 100 times.

Referring again to the condition wherein counter 55 contains a count of 11 (weight 12), the output pulses at terminal 140b from frequency selector stage 59b will be 10 pulses, one each for the 10 cycles of counter stage 60b. An additional eleventh pulse on line 83 is derived from counter stage 120A, AND gate 130a, EXCLUSIVE-OR gate 136a, and NAND gate 138a as a result of the 1 in frequency counter stage 144A. The 12 pulse from line 187 renders a total of 12 pulses on line 6 for 1 cycle of frequency counter 60.

It is apparent from the above description that the frequency counter 60 and the frequency selector 59 together form a means for selecting output pulses to form a second pulse train on line 6 exhibiting a number of pulses proportional to the count in the bidirectional counter constituted by velocity counter 55. Since the frequency counter 60 is cyclically stepped through many cycles, the second pulse train on line 6 has a frequency proportional to the count in the velocity counter 55.

Zero Detect (ZD)

In FIG. 5b, the zero detector 88 is constituted by NOR gates 146a, 146b, and 146c which correspond to velocity counter stages 55a, 55b, and 55c, respectively. For simplicity, the NOR gate inputs are shown as derived from the right-hand side of the velocity counter stages 55a through 55c, but those inputs are typically derived from lines connected to terminals 145a through 145d for NOR gate 146a, 145'a through 145'd, for NOR gate 146b, and 145''a through 145''d, and for NOR gate 146c. NOR gates 146a through 146c each have their outputs connected as inputs to AND gate 148 the latter of which has its output on line 89 connected to the integration control means (ICM) 53. The function of the zero detector 88 is to detect in a conventional manner when each of the stages 55a through 55c contains all zeros. Zero detector 88 renders an output signal on line 89 when all stages of velocity counter 55 are zero. In a particular implementation, the inputs to NOR gates 146a through 146c are connected to the outputs of the stages of each of the stages 55a through 55c. An all 0 condition in velocity counter 55 renders inputs to NOR gates 146a through 146c as 0's so that those NOR gates deliver all 1's to AND gate 148 which in turn places a 1 on line 89 signifying the all 0 condition of counter 55.

Integration Control Means (ICM)

In FIG. 5 a, the integration control means (ICM) 53 functions to receive the first pulse train on line 84, having a frequency representing the magnitude of the acceleration signal $d^2F(y)/dt^2$, and to deliver that first pulse train via either line 80 or line 81 to velocity counter 55, thereby causing counter 55 to count up or count down. Integration control means 53 controls the direction of counting (direction of integration) of counter 55 by controlling which one of lines 80 or 81 is selected.

The first pulse train on line 84 typically has a constant frequency of $1 \times 10^3$ pulses/sec. That constant frequency is derived by the $1 \times 10^3$ division in frequency counter 60 of the $1 \times 10^6$ pulse frequency of the timing signal on line 22. Each pulse input on line 84 is strobed in NAND gate 167 by the timing signal input on line 22. The output from NAND gate 167 is therefore a strobed acceleration signal which is connected through inverter 168 on line 170 to NAND gates 163, 164, and 186. NAND gates 163 and 164 transmit, under the conditions hereinafter described, the pulses of the strobed acceleration signal on line 170, either via line 80 or line 81, to the velocity counter 55.

In FIG. 5a, the control signal generator (CSG) 51 delivers inputs on lines 77 and 78 to the integration control means 53. The input on line 78 is connected to the D input of a conventional D-type flip-flop 171. Flip-flop 171 functions to store the sign for the count in velocity counter 55 and hence is designated the sign flip-flop (Sign FF). Flip-flop 171 is set at a 1 or 0 as a function of the 1 or 0 on line 78 from control signal generator 51 at a time when the clock input to flip-flop 171 is energized by a positive-going output from NOR gate 169. The energization of NOR gate 169 which causes flip-flop 171 to be set by the signal on line 78 will be described hereinafter.

The Q output from flip-flop 171 on line 171Q is connected as an input, along with line 77 from control signal generator 51, to the EXCLUSIVE-OR gate 174. The output from EXCLUSIVE-OR gate 174 on line 175 is connected as inputs to NOR gate 161 and inverter 177.

The function of the EXCLUSIVE-OR gate 174 is to either enable NOR gate 161 or NOR gate 158 via the inverter 177 input. NOR gate 158 receives an input from inverter 177 and the Q output of a zero detect flip-flop 157 which is designated as the second zero detect flip-flop (ZD2). NOR gate 158 has its output connected as an input to NAND gate 163 which also receives an input, as described above, from inverter 168. NOR gate 158 functions at certain times to inhibit the operation of NAND gate 163 to inhibit count-up pulses via line 80 to counter 55.

NOR gate 161, similar to NOR gate 158, functions by delivering its output as an input to NAND gate 164 where, NAND gate 164, as previously described, has an input connected from the output of inverter 168 via line 170. The function of NOR gate 161 is to inhibit the strobe pulses on line 170 from being applied via line 81 to counter 55 thereby inhibiting counter 55 from counting down.

Line 89 from the zero detector 88 is connected to the clear inputs C of the D-type flip-flops 155 and 157 which are designated as the first and second zero detect flip-flops (ZD1 and ZD2), respectively. The Q output of flip-flop 155 is connected to the D input of flip-flop 157. Both flip-flops 155 and 157 have their clock inputs C connected to the (1) line 83 derived from frequency selector 59. The $\overline{Q}$ output of flip-flop 155 is connected to its D input. The function of flip-flop 155 is to store, when a negative-going signal appears on line (1), its own $\overline{Q}$ output provided the level of the zero detect line 89 is a 1. If the level on line 89 is a 0, the line 89 inputs to the clear inputs, C, of both flip-flops 155 and 157 functions to reset both flip-flops so that the Q outputs of each are 0. The first pulse which occurs on line 83 after zero detect line 89 has been set to a 1 sets flip-flop 155 to a 1. Thereafter, the second pulse on line 83 resets flip-flop 155 and transfers a 1 into flip-flop 157. The operation of flip-flops 155 and 157 is, therefore, that of a shift register. The Q output of flip-flop 155 is one input to NAND gate 185 and that Q output functions to enable NAND gate 185 whenever flip-flop 155 is reset to a 0. Any zero input to a NAND gate forces a 1 out. A 1 on the output of NAND gate 185 enables NAND gate 186 thereby allowing strobed pulses on line 170 to pass through NAND gate 186 to line 187 and therefrom through NAND gate 188 to line 6. When flip-flop 155 is set to a 1, its Q output is a 1. If the signal on line 187 from inverter 177 is also a 1, then the output of NAND gate 185 is a 0, thereby inhibiting the operation of NAND gate 186 and preventing any pulses on line 170 from being transmitted via line 187 and NAND gate 188 to line 6.

The Q output from flip-flop 157 enables NOR gate 158 whenever it is 0 and forces a 0 output whenever it is 1. The 0 output to NAND gate 163 inhibits its operation so that whenever flip-flop 155 is set to a 1, all pulses on line 80 are inhibited. The $\overline{Q}$ output of flip-flop 157 enables NOR gate 169 whenever it is 0, thereby allowing flip-flop 171 to be clocked by a signal from NAND gate 167.

In order to further describe the details of the integration control means (ICM) 53 of FIG. 5a, the following CHART III is referred to:

CHART III

| | | CSG 51 | (±) Sign FF | C-I | Vel. Ct. Inputs | | ZD | ZD1 155 | ZD2 157 | FS 59 | RCT lines 84+187 |
|---|---|---|---|---|---|---|---|---|---|---|---|
| | | | | | CU | CD | | | | | |
| | Vel. weight | Line 84 | Line 77 | Line 171Q | Line 187 | Line 80 | Line 81 | Stage 55a | Line 89 | Line 155Q | Line 157Q | No. pulses, line 83 | No. pulses, line 6 |
| A | +3 | X | --- | 0 | X | --- | --- | 0010 | 0 | 0 | 0 | 2 | +3 |
| | +2 | {X (t1-t3)} | 0 (t1) | } 0 | {X (t2-t3)} | } --- | {X (t2-t3)} | 0001 | 0 | 0 | 0 | 1 | {+2 (t2-t4)} |
| | +1 | {X (t4-t6)} | 0 (t4) | } 0 | {X (t5-t6)} | } --- | {X (t5-t6)} | 0000 | 1 | 1 | 0 | 0 | {+1 (t5-t6)} |
| | 0 | {X (t7-t9)} | 0 (t7) | } 0 | --- | --- | --- | 0000 | 1 | 0 | 1 | 0 | 0 |
| | −1 | {X (t10-t12)} | 0 (t10) | 1 (t11) | X (t11-t12) | }--- | --- | 0000 | 1 | 1 | 0 | 0 | {−1 (t11-t12)} |
| | −2 | X | 0 | 1 | X | X | --- | 0001 | 0 | 0 | 0 | 1 | −2 |
| B | +2 | X | 0 | 0 | X | --- | X | 0001 | 0 | 0 | 0 | 1 | +2 |
| | +1 | X | 0 | 0 | X | --- | X | 0000 | 1 | 1 | 0 | 0 | +1 |
| | 0 | X | 0 | 0 | --- | --- | --- | 0000 | 1 | 0 | 1 | 0 | 0 |
| | +1 | X | 1 | 0 | X | --- | --- | 0000 | 1 | 1 | 0 | 0 | +1 |

Referring to CHART III, an operation in which the velocity counter 55 counts from a weight of +3 down through 0 to a weight of −2 is represented in part A. Part B shows a reversal at 0 counting +1, 0, +1. With such weighted counts higher order stages 55b and 55c of counter 55 are all zeros. As shown in CHART III, part A, stage 55a counts from 0010 down to 0000 and from there up to 0001. In order to cause integration control means 53 to cause counter 55 to count in that manner, control signal generator 51 has an output 0 on line 77 and an output 1 on line 78 as forced by a negative signal on line 50. As previously indicated, the acceleration signal, defined in magnitude by the pulse frequency of the first pulse train on line 84, has a constant frequency and this frequency also controls the timing of the integration control means 53. The time between two pulses on line 84 establishes the timing cycle for integration control means 53.

Figure 6:
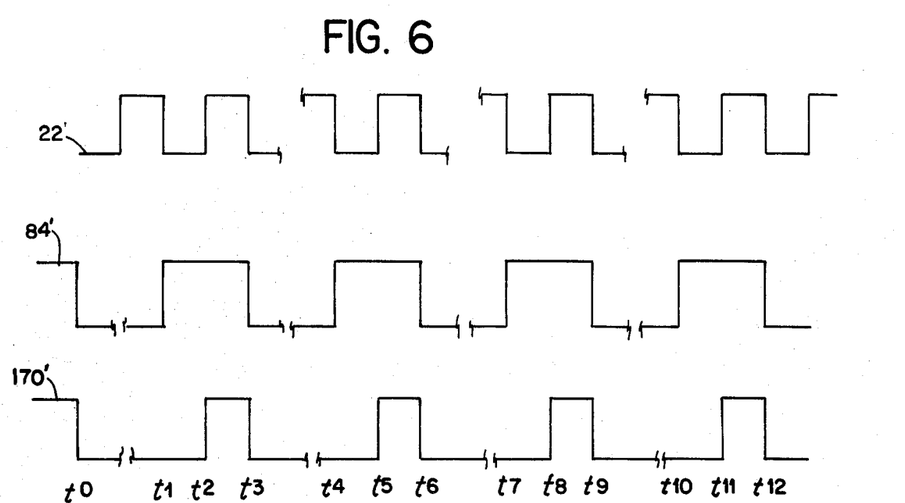
FIG. 6 depicts waveforms representative of the operation of the tracking control means of FIG. 5.

The timing cycle in CHART III is further explained in connection with FIG. 6. In FIG. 6, the pulse train 22' represents the $1 \times 10^6$ pulses/sec. signal on line 22 of FIGS. 5a and 5b. In FIG. 6, pulse train 84' represents the $1 \times 10^3$ pulses/sec. signal on line 84 of FIGS. 5a and 5b. Similarly, pulse train 170' represents the strobed $1 \times 10^3$ signal on line 170 of FIG. 5a. Significant timing points in CHART III and FIG. 6 are identified by times $t0$ to $t12$. Typical timing cycles run between $t0$ and $t3$, $t3$ and $t6$, $t6$ and $9$, and $t9$ and $t12$.

In CHART III, time generally moves horizontally from left to right. The first occurrence in each cycle is a pulse on line 84. Proceeding from left to right starting with the column for line 77 and ending with the column for line 89, the occurrences represented by the columns therebetween occur during the pulse time of each pulse on line 84 or very shortly thereafter. The occurrences on line 155Q and 157Q occur at a much later time, approximately half-way between two pulses on line 84. The occurrences on lines 83 and 6 are generally distributed across the whole cycle with an essentially even distribution.

To arrive at the +3 weighted count, referring to Part A of CHART III, counter stage 55a either counts down from 4 or counts up from 2. To count down, line 77 from control signal generator 51 is a 0, and to count up, line 77 is a 1. Since a positive value, +3, is a starting point, the sign flip-flop 171 is set to a 0 as indicated by the zero in the line 171Q column. Since stage 55a is 0010, the zero detect line 89 is necessarily a 0. With zero detect line 89 a 0, then necessarily zero detect flip-flops 155 and 157 are reset, via the clear inputs, to zeros.

With these preset conditions, the +3 cycle commences by a pulse on line 84. That pulse appears on line 187 and also produces a pulse on either line 80 or 81, depending on the 1 or 0 condition of line 77, thereby causing stage 55a to count up or down into a count of 0010. That count in stage 55a causes line 89 to be a 0. The number of pulses on line 83, therefore, is 2 as a result of the 0010 count in stage 55a for reasons explained above. The pulses on line 83 when coupled with the pulse on line 187 total 3 pulses on line 6 for the +3 cycle.

The +2 cycle commences with a pulse on line 84. Referring both to FIG. 6 and to CHART III, that pulse on line 84 commences at $t1$ and terminates at $t3$. At t1 the control signal generator 51 is energized by the leading edge of the line 84 pulse to detect the level of the error signal on line 50 to form a 0 output on line 77 since it is assumed that we are to be counting down. Because NOR gate 169 is not energized, the 0 on line 171Q cannot be changed. The pulse on line 84 is sampled in NAND gate 167 and passed through inverter 168 to line 170 where it passes through enabled NAND gate 186 to line 187 from where it is passed through NAND gate 188 to form an output pulse on line 6. That pulse also appearing on line 170 is passed through NAND gate 164 to line 81 between times $t2$ and $t3$ to count down stage 55a to a 0001 count. With that count, zero detect line 89 remains a 0 thereby forcing the first and second zero detect flip-flops 155 and 157 to remain with zeros. The 0001 count in stage 55a produces one output pulse on line 83 which when coupled with the pulse on line 187 produces on output line 6 2 pulses during the +2 cycle period. Since we have still assumed that the line 77 has not changed, the count down direction dictated by a 0 on line 77 is continued. The +1 cycle commences with a pulse on line 84 between $t4$ and $t6$. At $t4$, line 50 is again sampled by the control signal generator 51 still maintaining the 0 on line 77. Line 171Q may not change because the second zero detect flip-flop 157 is still set to 0 preventing NOR gate 169 from being enabled. Between $t5$ and $t6$, the strobed pulse appearing on line 170 as derived from line 84 is applied to NAND gate 186 and passed on to line 6. Similarly, the pulse on line 170 is passed through NAND gate 164 to line 81 to count down counter stage 55a to a count of 0000. This count in counter stage 55a causes the zero detect line 89 to be a 1. That 1 on zero detect line 89 is transferred into the first zero detect flip-flop 155 at a time about half-way between $t6$ and $t7$. The all-zero condition of stage 55a insures that no pulses appear on line 83 during the +1 cycle so that output line 6 receives only one pulse as derived from line 187 during the +1 cycle. With the error signal on line 50 still negative, the +1 cycle is followed by the 0 cycle commencing with a pulse on line 84 between $t7$ and $t9$. At $t7$, line 50 is again sampled to detect its zero condition. During the 0 cycle, the 171Q line may not change because the second zero detect flip-flop 157 is still reset to a 0. Because the first zero detect flip-flop 155 is still at a 1 during this part of the zero cycle, no pulse is transmitted to line 187 because line 155Q is a zero input to NAND gate 185, thereby forcing the output of NAND gate 185 to a 1. The 1 input to NAND gate 186 inhibits NAND gate 186 from communicating a pulse to line 187 as indicated.

Similarly, with 0's on lines 77 and 171Q, EXCLUSIVE-OR gate 174 has a 0 on line 175. That 0 on line 175 enables NOR gate 161, but produces a 1 output from inverter 177 which forces the output of NOR gate 158 to a 0 acting as an input to NAND gate 163 which inhibits the transmission of any pulses on line 170 to the count-up line 80. Although NOR gate 161 is enabled by the 0 on line 175, the 1 on zero detect line 89 forces the output of NOR gate 161 to a 0 thereby also inhibiting the operation NAND gate 164 preventing any count down on line 81. Since neither a count up or a count down has occurred, stage 55a retains its 0000 count thereby leaving line 89 a 1. Half-way through the cycle, the timing inputs to flip-flops 155 and 157 are operative to toggle flip-flop 155 to a 0 while transferring a 1 into flip-flop 157. During the 0 cycle, no pulses appear on line 83 or on line 6.

With the error signal on line 50 still negative, the 0 cycle is followed by a −1 cycle. The −1 cycle is commenced with a pulse on line 84 occurring between $t10$ and $t12$. At $t10$, the line 50 is sampled again detecting the negative level which forces a 0 on line 77. With the second zero detect flip-flop 157 set to 1, line 171Q can change since the sign flip-flop 171 is enabled via NOR gate 169. NOR gate 169 and, therefore, flip-flop 171 are energized at time $t11$ thereby setting the 1 from line 78 into flip-flop 171 as it appears on line 171Q. During the time $t11$ and $t12$, the line 84 pulse is strobed and transmitted through to line 187. The 0 and 1 conditions of lines 77 and 171Q, respectively, through EXCLUSIVE-OR gate 174, inhibit through NOR gate 161 the NAND gate 164 thereby preventing a count down pulse on line 81. The 1 set in the second zero detect flip-flop 157 similarly forces the output of NOR gate 158 to a 0, thereby inhibiting NAND gate 163 and preventing a count-up pulse on line 80. Stage 55a therefore remains at the 0000 count leaving line 89 a 1. Thereafter, about a half cycle later, the timing signal input on line (1) to both zero detect flip-flops 155 and 157 transfers the 0 from flip-flop 155 into flip-flop 157 and resets flip-flop 155 to a 1 since zero detect line 89 is still a 1. With zeros in stage 55a, line 83 receives no pulses during the −1 cycle and line 6 receives 1 pulse as derived from line 187. The pulse on line 6 represents a negative count since the sign flip-flop 171 is set to a 1 as indicated by the line 171Q entry at t11 and represented by the 171$\overline{Q}$ inversion in inverter 179 forming on 1 on line 5. A 1 on line 5 represents negative counts on line 6 and a 0 on line 5 represents positive counts.

With the error signal on line 50 still negative, a count down from the −1 cycle is entered for the −2 cycle. The −2 cycle begins with the pulse on line 84 followed by the sampling of the error signal on line 50 by the control signal generator 51 so that a 0 still appears on line 77. Line 171Q cannot change at this time so that its level remains a 1. The line 187 pulse appears as does a count-up pulse on line 80 because of the 1 and 0 level conditions of lines 77 and 171Q, respectively. That count-up pulse on line 80 forces stage 55a to a 0001 condition thereby causing a 0 to appear on zero detect line 89. The 0 line 89 forces the zeros on lines 155Q and 157Q as previously explained. The 0001 count in stage 55a generates one pulse on line 83 which when coupled with the pulse on line 187 produces a total of 2 pulses on line 6. Again the sign of those pulses on line 6 are negative because of the 1 on line 171Q.

Part B of CHART III depicts a variation of the counting where the integration control means 53 of FIG. 51 causes counter 55a to count from +2 down to 0 where it reverses sign and counts up again to +1.

Generator

Figure 8A:
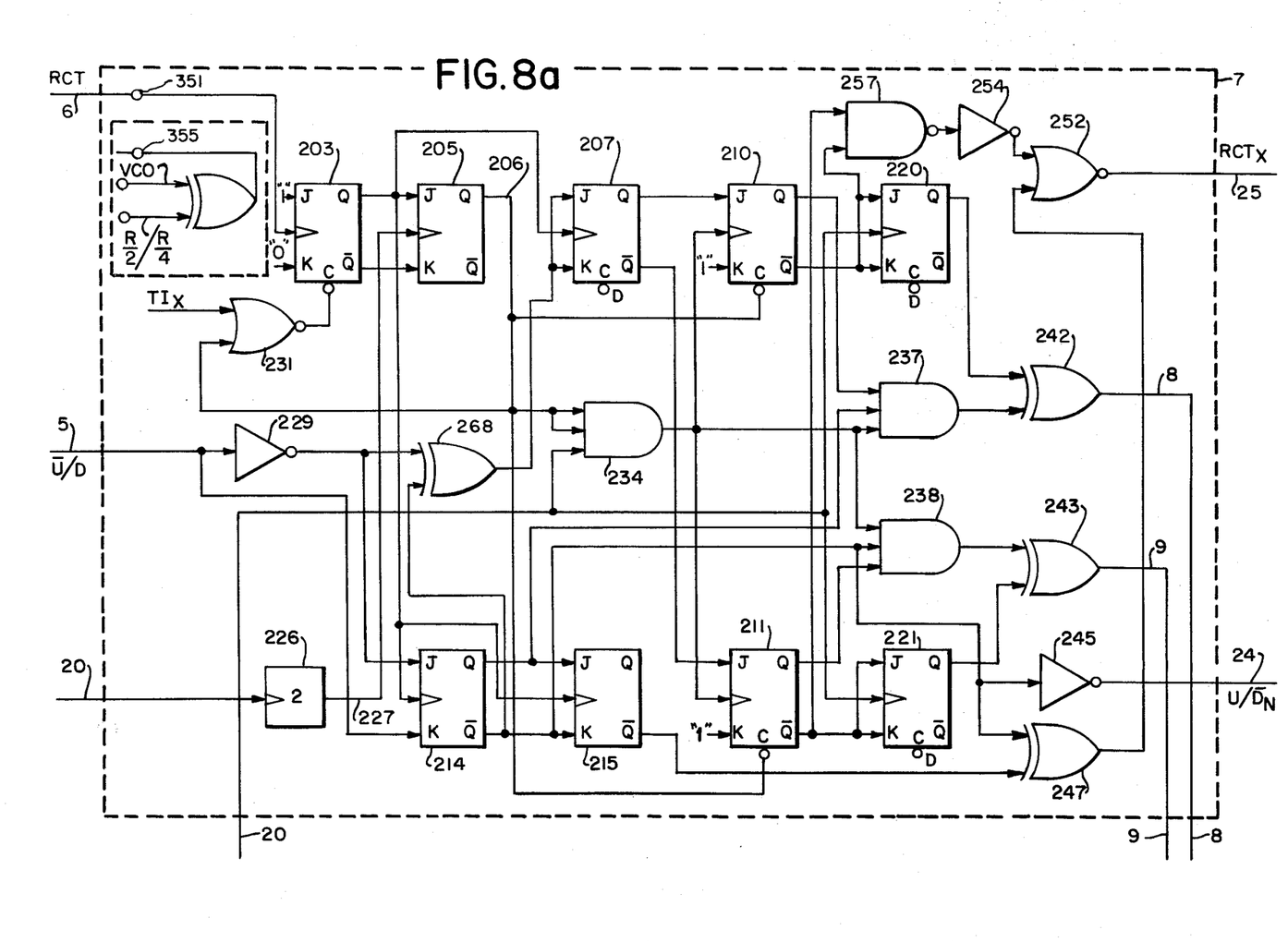
FIGS. 8a and 8b depict details of one embodiment of the digital sine/cosine generator 1 of FIG. 2.
Figure 8B:
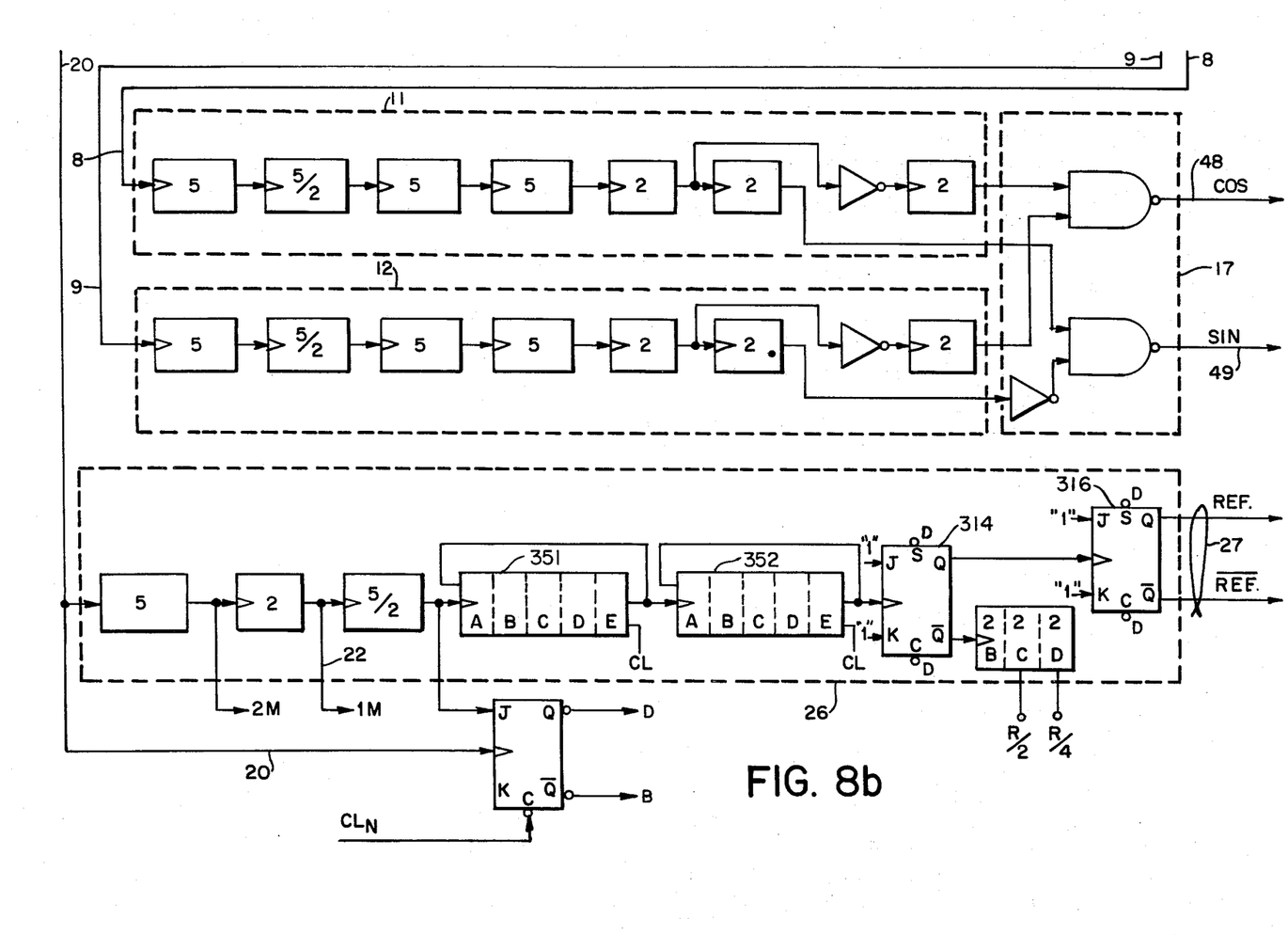

The generator 1 of FIG. 2 is depicted in one preferred embodiment in FIGS. 8a and 8b. Referring both to FIG. 2 and to FIGS. 5a and 5b, the FIGS. 8a and 8b generator receives the pulses on line 6 from the tracking control means 4 and carries out an integration process with a counting direction controlled by the $\overline{U}$/D signal on line 5.

The FIGS. 8a and 8b apparatus includes a control and generation means 7 in FIG. 8a which depicts the detail of the like-numbered device of FIG. 2. Similarly, the first counter 11, second counter 12, logical combining means 17, and reference counter 26 of FIG. 8b correspond to the like-numbered devices of FIG. 2.

In FIG. 8a the control and generation means 7 accepts the pulses on line 6 which has a frequency representing the velocity $dF(y)/dt$ which is to be integrated to form the value $F(y)$. The direction of integration is controlled by the signal on line 5 where lines 5 and 6 are derived from the integration control means 53 of FIG. 5a. The pulse train on line 6 is applied as the clock input to a JK flip-flop 203 where the J and K inputs are connected to 1 and 0 levels, respectively. The Q and $\overline{Q}$ outputs of flip-flop 203 are connected directly to the J and K inputs, respectively, of a second flip-flop 205. The clock input of flip-flop 205 is energized by a negative-going pulse on line 227 which is derived from a countdown of the clock signal on line 20 via divide by 2 circuit 226. Flip-flops 203 and 206 serve as a shift-register for time synchronizing each pulse input on line 6 to provide a time pulse on line 206. Line 206 is derived from the Q output of flip-flop 205 and is applied to the clock input of a flip-flop 207 having both its J and K inputs tied to 1 and functioning to divide by 2 the number of pulses on line 206. Each pulse on line 206, while at the 1 level, enables AND gate 234 and enables JK flip-flops 210 and 211 via their clear inputs. Flip-flops 210 and 211 each have their K inputs tied to a 1 and J inputs connected to the Q and $\overline{Q}$ outputs of flip-flop 207, respectively. Flip-flops 210 and 211 are complementarily energized for each input pulse on line 6 as a function of the state of flip-flop 207. Since flip-flop 207 alternates states for each pulse on line 6, flip-flops 210 and 211 alternate states for each input on line 6.

The $\overline{Q}$ outputs for flip-flops 210 and 211 are connected to the J and K inputs of flip-flops 220 and 221, respectively. The clock inputs of flip-flops 220 and 221 are each connected to receive the clock signal on line 20. Flip-flops 220 and 221 function to divide by 2 that clock signal on line 20 and produce on the respective Q outputs a pulse train of half the frequency. The Q outputs from flip-flops 220 and 221 serve as inputs to EXCLUSIVE-OR gates 242 and 243, respectively. The outputs from EXCLUSIVE-OR gates 242 and 243 appear on lines 8 and 9 connected as inputs to the first counter 11 and the second counter 12, respectively. Under normal operation, in the absence of any pulses on line 6, flip-flops 220 and 221 are each operative to divide by 2 the frequency of pulses on line 20. Accordingly, an equal number of output pulses appears on lines 8 and 9 and the first counter 11 and the second counter 12 are each stepped in synchronism with an equal number of input counts. Whenever a pulse appears on line 6, either flip-flop 220 or flip-flop 221 is inhibited from switching thereby inhibiting one of the pulses on line 8 or line 9, respectively. Which of the lines 8 or 9 has the inhibited pulse is controlled basically by the flip-flop 207.

A further control on the pulses applied to lines 8 and 9 to the first and second counters results from the operation of the up/down signal on line 5. Line 5 has its 1 or 0 level applied to the K input of a JK flip-flop 214 and its inverted level via inverter 229 to the J input of flip-flop 214. The 1 or 0 level of line 5 is stored in flip-flop 214 when a negative-going pulse is present on its clock input derived from the Q output of flip-flop 203. The flip-flop 214 has its Q and $\overline{Q}$ outputs connected directly to the J and K inputs, respectively, of a JK flip-flop 215. Flip-flops 214 and 215 serve as a shift register for storing the level of the signal on line 5. The clock input of flip-flop 215 is the same as the clock input for flip-flop 214 as derived from the Q output of flip-flop 203. The Q and $\overline{Q}$ outputs of flip-flop 214 are connected to AND gates 237 and 238, respectively. AND gates 237 and 238 also receive inputs from the Q outputs of flip-flops 210 and 211, respectively. The third input to the AND gates 237 and 238 is derived from the AND gate 234. The outputs from AND gates 237 and 238 are connected as inputs to EXCLUSIVE-OR gates 242 and 243, respectively. The AND gates 237 and 238 function to bypass the flip-flops 220 and 221 delivering output pulses to lines 8 and 9 via EXCLUSIVE-OR gates 242 and 243. Since the divide by 2 functions of the flip-flops 220 and 221 are bypassed when the AND gates 237 and 238 are energized, the weight of the pulses on lines 8 and 9 are double that of pulses transmitted via flip-flops 220 and 221. AND gate 237 is enabled only when flip-flop 220 is inhibited and, similarly, AND gate 238 is enabled only when flip-flop 221 is inhibited. The manner in which the enabling and inhibiting of the various devices in the control and generation means 7 of FIG. 8a operate are described and claimed in the above-identified copending application Ser. No. (see page 2, line 16, No. 4 under CROSS REFERENCE TO RELATED APPLICATIONS filed simultaneously herewith).

OPERATION

The details of operation of the FIG. 1 system organized as a readout device such as in FIG. 2 is explained with reference to two examples. In the first example, referring to FIG. 2, it is assumed that the $F(x)$ input 3 is in the form of approximately 9-½ bits of displacement of the relatively movable members 40 and 41 of the Inductosyn transducer 42. The first example therefore represents a static null operation. In that example, each bit is representative of $10^{-4}$ inch, so that 9-½ bits represents a distance traveled of $9\frac{1}{2} \times 10^{-4}$ inch of the Inductosyn transducer movable member. With this input, it is the function of the readout apparatus of FIG. 2 to measure the 9-½-bit input, store it in the external counter 32, and display it in the display 34. A positive or negative sign is employed to define the directions of movement from a zero reference.

The details of such a typical operation are further described in connection with CHART IV below, where a —9-½-bit input is described.

CHART IV

| Cycle | F(x) Pos. | Ext. ct. 32 | Vel. ct. 55 | F(y) line 50 | line 109 | line 77 | line 1710 |
|---|---|---|---|---|---|---|---|
| 1 | —9½ bits | 0 | 0 | +9½ | +9½ | 1 | 0 |
| 2 | —9½ | —1 | —1 | +9½ | +9½ | 1 | 0 |
| 3 | —9½ | —3 | —2 | +8½ | +7½ | 1 | 0 |
| 4 | —9½ | —6 | —3 | +6½ | +3½ | 1 | 0 |
| 5 | —9½ | —8 | —2 | +3½ | —2½ | 0 | 0 |
| 6 | —9½ | —9 | —1 | +1½ | —1½ | 0 | 0 |
| 7 | —9½ | —9 | 0 | +½ | —½ | 0 | 0 |
| 8 | —9½ | —10 | —1 | +½ | +½ | 1 | 0 |
| 9 | —9½ | —10 | 0 | —½ | —1½ | 0 | 0 |
| 10 | —9½ | —9 | +1 | —½ | —½ | 0 | 1 |
| 11 | —9½ | —9 | 0 | +½ | +1½ | 1 | 1 |
| 12 | —9½ | —10 | —1 | +½ | +1½ | 1 | 0 |
| 13 | —9½ | —10 | 0 | —½ | —1½ | 0 | 0 |
| 14 | —9½ | —9 | +1 | —½ | —½ | 0 | 1 |

Referring to FIG. 2 and to CHART IV, the constant —9½ bits input as applied by position input 3 of FIG. 2 is represented by the left-hand column of CHART IV labeled $F(x)$. The right-hand columns represent various values relating to $F(y)$. Specifically, the columns represent the accumulated content in external counter 32, the accumulated content of the velocity counter 55, the analog magnitude of the signals on lines 50 and 109 of FIG. 4, and the digital 1 or 0 of the signals on lines 77 and 171Q.

As indicated by the first horizontal line in CHART IV, the external counter 32 and the velocity counter 55 are both reset to zero. With the constant —9-½ bits input, the error signal on line 50 is +9-½. The analog value of the signal on line 109 is determined in each cycle by performing the operations defined by Equation (2) above. During the first cycle, the value on line 109 is +9 -½ because of the absence of any prior velocity levels. Because line 109 is positive, line 77 is set to 1. It is assumed that line 171Q is set to 0. Each line in CHART IV represents one timing cycle as measured by a cycle of frequency counter 60. With the error signal on line 50 at +9-½, the velocity counter 55 is stepped —1, thereby generating one pulse on line 6, which in turn causes one pulse to be propagated to external counter 32, thereby causing it to count to —1. At the beginning of the next cycle, a signal on line 109 is still positive, thereby causing velocity counter 55 to be stepped to —2, which respectively increments the external counter 32 to —3. During the fourth cycle, the velocity counter 55 is stepped to —3 and the external counter is thereby incremented to —6. During the fifth cycle, the signal on line 109 has shifted from positive or negative, thereby causing line 77 to switch to 0, which in combination with the 0 on line 171Q causes velocity counter 55 to be decremented to —2, thereby incrementing external counter 32 to —8. During the sixth cycle, the line 109 signal is still negative, causing counter 55 to be decremented to —1 and external counter 32 to be incremented to —9. The seventh cycle steps velocity counter 55 to 0. Leaving external counter 32 at —9. During the eighth cycle, velocity counter 55 is stepped again to —1 because of the reversal of the line 109 signal to a positive level. The ninth cycle returns the velocity counter 55 to 0, and the tenth cycle, to a +1. Thereafter, velocity counter 55 and internal counters 11 and 12 are in an oscillating mode where the internal counters oscillate with a count difference between —10 and —9 and velocity counter 55 oscillates between +1, 0 and —1. The —10 to —9 oscillation of the internal counters bracket the —9-½ bits value of $F(x)$. In CHART IV, external counter 32 has been shown exhibiting the —10/—9 oscillation. In a preferred embodiment as represented by the FIG. 8a and FIG. 8b circuits, that one bit oscillation is inhibited from the external counter 32. CHART IV would, therefore, be all —9's after cycle 7.

In the second example, the readout device of FIG. 2 is described under the condition that the $F(x)$ variable starts at zero velocity and zero position with an assumed acceleration, arbitrarily chosen for example, of $10^5$ bits/sec.² It is assumed by way of example that after the velocity has reached a value of $2 \times 10^3$ bits/sec, that the acceleration becomes zero. After the acceleration becomes zero, the velocity of the measuring function $F(y)$ oscillates about the velocity of the $F(x)$ function. The second example represents, therefore, a dynamic null operation.

The second example is described in detail in connection with CHART V below.

CHART V

| | F(x) | | | F(y) | | | |
|---|---|---|---|---|---|---|---|
| Cycle | Acc. (Bits/sec.²) | Vel. (10³ bits/sec.) | Pos. (bits) | Ext. ct. 32 (bits) | Vel. ct. (10³ bits/sec.) | Line 109 | Line 77 | Line 1710 |
| 1 | —10⁵ | 0 | 0 | 0 | 0 | 0 | 1 | 0 |
| 2 | —10⁵ | —.1 | —.05 | 0 | 0 | 0 | 1 | 0 |
| 3 | —10⁵ | —.2 | —.2 | —1 | —1 | +1.05 | 1 | 0 |
| 4 | —10⁵ | —.3 | —.45 | —1 | 0 | —1.6 | 0 | 0 |
| 5 | —10⁵ | —.4 | —.8 | 0 | +1 | —.15 | 0 | 0 |
| 6 | —10⁵ | —.5 | —1.25 | 0 | 0 | +2.2 | 1 | 0 |
| 7 | —10⁵ | —.6 | —1.8 | —1 | —1 | —1 | 0 | 0 |
| 8 | —10⁵ | —.7 | —2.4 | —3 | —2 | +.4 | 1 | 0 |
| 9 | —10⁵ | —.8 | —3.2 | —4 | —1 | —1.9 | 0 | 0 |
| 10 | —10⁵ | —.9 | —4.05 | —4 | 0 | —1 | 0 | 0 |
| 20 | —10⁵ | —1.9 | —18.05 | —19 | —2 | —1.9 | 0 | 0 |
| 21 | —10⁵ | —2.0 | —20 | —20 | —1 | —1.02 | 0 | 0 |
| 22 | 0 | —2 | —22 | —22 | —2 | +1 | 1 | 0 |
| 23 | 0 | —2 | —24 | —25 | —3 | +0 | 1 | 0 |
| 24 | 0 | —2 | —26 | —27 | —2 | —2 | 0 | 0 |
| 25 | 0 | —2 | —28 | —28 | —1 | —1 | 0 | 0 |
| 26 | 0 | —2 | —30 | —30 | —2 | +1 | 1 | 0 |
| 27 | 0 | —2 | —32 | —33 | —3 | +0 | 1 | 0 |
| 28 | 0 | —2 | —34 | —35 | —2 | —2 | 0 | 0 |
| 29 | 0 | —2 | —36 | —36 | —1 | —1 | 0 | 0 |

Referring to CHART V, the external counter 32 and the velocity counter 55 are reset to zero. The analog level of line 109 is initially at 0, so that line 77 is 1, and again, line 171Q is assumed to be 0. After the acceleration of $-10^5$ is applied as an impulse in the first cycle, the $F(y)$ circuitry tracks $F(x)$ within one bit, as shown by comparing the "Ext. Ct. 32" column for $F(y)$ with the $F(x)$ "Pos." column. External counter 32 remains within one bit of the $F(x)$ position value until a velocity of $-2 \times 10^3$ bits/sec is reached in the 21 cycle. After the sixth cycle, the external counter 32 has a count which oscillates within one bit of the $F(x)$ position. The first 6 cycles are a transient condition resulting from the $-10^5$ bits/sec$^2$ acceleration impulse. Note that the count in velocity counter 55 oscillates between $-3$, $-2$ and $-1$ so as to bracket the $-2$ velocity of the $F(x)$ function.

FURTHER AND OTHER EMBODIMENTS

While it has been assumed in describing the above embodiment that tracking control means of the present invention has a maximum acceleration capability up to $10^6$ bits/sec$^2$, it is, of course, within the present invention to have differing values of maximum acceleration. Specifically, the $10^6$ value of acceleration is determined by a $10^6$ bits/sec timing signal applied on line 22 to a 1,000 count frequency counter 60. Each unit change in count stored in counter 60 represents a change of $10^3$ bits/sec. The rate at which counter 55 is operative to select different counts from counter 60 is at $10^3$ steps/sec. The $10^3$ rate of change from counter 55 multiplied by the $10^3$ step represented by each unit count change of counter 60 results in a product of $10^6$, which defines the acceleration in bits/sec.$^2$.

An acceleration of $10^6$ bits/sec$^2$ for a system in which each bit represents $10^{-4}$ inch represents an acceleration of 100 in/sec$^2$. That value of acceleration is approximately one-fourth the acceleration of gravity.

In order to provide a system capable of higher rates of acceleration, counter 60 may, for example, be reduced in count from 1,000 to 200. With such a reduction, each unit change in count in counter 60 represents $5 \times 10^3$ and the frequency of the first pulse train on line 84 is $5 \times 10^3$ Hz. With that frequency for the pulse train on line 84, counter 55 is also stepped at that $5 \times 10^3$ rate. Accordingly, the product of the stepping rate of counter 55 with the per unit step of counter 60 is $25 \times 10^6$, which defines the acceleration in bits per second$^2$. Such an acceleration is a factor of 25 improvement over the previously described system having an acceleration of $10^6$ bits/sec$^2$. That is, an acceleration of $25 \times 10^6$ bits/sec$^2$ is approximately 6 -¼ times that of gravity.

In addition to the acceleration limit of the present invention, the maximum velocity limit is also of interest. In the previously described embodiments, velocity counter 55 was selected to have a maximum capacity of 1,000 counts where each count was representative of a velocity of $1 \times 10^3$ bits/sec representing a maximum velocity of $10^6$ bits/sec. For a system in which each bit represents $10^{-4}$ inch, a maximum velocity of 100 in/sec is achieved. If greater velocities are required, then counter 55 may be given a greater capacity; or, alternatively, after counter 55 reaches its maximum count, an overflow indication (not shown) may be employed so that a much higher velocity is selected. For example, an overflow from counter 55 at a velocity of $10^6$ bits/sec might jump to a velocity of $10 \times 10^6$ bits/sec. Suitable means not shown then are provided for supplying a pulse train on line 83 at a frequency of $10^7$ bits/sec.

In addition to the acceleration and velocity considerations, the number of divisions for each position cycle may also be varied. For an Inductosyn transducer having a cycle of 0.2 inch, a typical system divides that cycle into 2,000 parts so that each bit represents $10^{-4}$ in. Systems with a greater number of divisions per cycle may, of course, be desired. For example, a system which divides by $10^4$ provides an apparatus where each bit represents $2 \times 10^{-5}$ inch. The number of divisions achieved by the systems of the present invention is determined by the count range of the first and second counters 11 and 12 of FIGS. 2 and 8.

A limiting factor on the acceleration, velocity, and number of divisions of the Inductosyn cycle is the maximum frequency of operation permissible by the electronic components employed in implementing the present invention. Specifically, referring to FIG. 2, a clock 21 having a frequency of $10^7$ requires electronic components capable of switching at the $10^7$ frequency. Generation means 7 and the first and second counters 11 and 12 divide the $10^7$ clock frequency by a factor of $5 \times 10^3$ in order to produce $10^4$ divisions of the Inductosyn transducer cycle. With this $5 \times 10^3$ division, the fundamental frequency of the signals on lines 28 and 29 is $2 \times 10^3$Hz. This value of fundamental frequency is a limitation on the bandwidth of the system, which is in turn a limitation on the response time in which the measuring function $F(y)$ can be changed to follow the to-be-measured function $F(x)$.

Referring to FIGS. 4 and 5, the error signal on line 50, after addition of the terms in adder 108, is sampled by the timing signal input on line 84 by the threshold detector 98. In accordance with well known sampling theory, no useful information results from sampling the error signal at a frequency greater than the fundamental frequency as determined by the frequencies of the signals on lines 48 and 49 of FIG. 2. The system of FIG. 2 similarly cannot respond faster than the sampling rate and, therefore, in order to increase the sampling rate, the fundamental frequency must be increased. In order to increase the fundamental frequency, either the frequency of clock 21 must be increased or the number of divisions in the first and second counters must be reduced. Increasing the frequency of clock 21 requires that the electronic components be capable of switching at higher speeds. Decreasing the number of counts in the first and second counter decreases the number of divisions into which the Inductosyn transducer cycle may be divided. Present-day practical limitations on switching speeds are in the $10^7$ to the $2 \times 10^7$ range. With a system which employs a clock having a frequency of $10^7$Hz and which divides the Inductosyn transducer cycle into $10^4$ increments, a sampling rate of $2 \times 10^3$H is employed. For a system which employs a clock frequency of $10^7$ and which divides the Inductosyn transducer cycle into $2 \times 10^3$ increments, a sampling rate of $10^4$ is produced.

Figure 7:
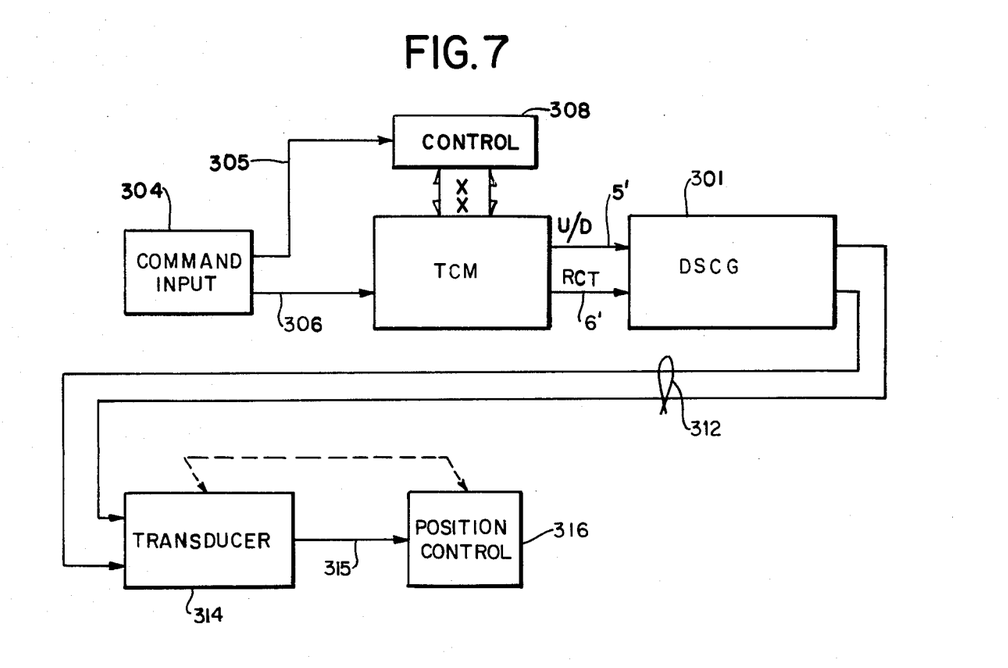
FIG. 7 depicts the tracking control means of FIGS. 3, 5a and 5b employed in an open loop position and velocity commanding system.

Referring to FIG. 7, a system which employs the tracking control means 4' of FIG. 1 is shown in an open-loop position-commanding embodiment. In FIG. 7, a command input device 304, such as a digital counter, supplies a commanded velocity via line 306 to the tracking control means 4 and a command position via line 305 to a control 308. The commanded velocity on line 306 is supplied to velocity counter 55 of FIG. 3 in any convenient form. Thereafter, velocity counter 55, in a convenient manner not shown, is prohibited from changing count. With a fixed count thus stored in velocity counter 55, a fixed frequency of RCT pulses on output line 6' is supplied to generator 301 of FIG. 7. Similarly, the commanded velocity on line 306 sets the U/D signal on line 5' to the appropriate 1 or 0 level in a conventional manner, not shown. The generator 301 supplies electronic signals via lines 313 to an Inductosyn transducer 314, which generates an error signal on line 315 in a conventional manner. The error signal on line 315 drives a position control 316, such as a motor, which in turn drives a relatively movable member of the Inductosyn transducer until the error signal on line 315 goes to 0. The error signal on line 315 continues to be generated at values tending away from 0 as long as RCT pulses on line 306 occur. The number of RCT pulses is generally controlled by control 308. Control 308 may include a well-known how-far-to-go counter such as the $\Delta$-counter 36 in FIG. 1a of the above-referenced application Ser. No. 814,670.

While the control signal generator is preferably designed in accordance with Equation (2) as previously described, it is, of course, possible and within the scope of the present invention to employ many signals derived from the error signal in controlling the threshold detector 98 of FIG. 4. Any suitable derivative, integration, filtering or other manipulation of the error signal may be employed. Still additionally, inputs other than those directly derived from the error signal, such as independently derived from a tachometer, may be employed in setting threshold detector 98.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for tracking a to-be-measured function $F(x)$, which exhibits a variation with respect to time $dF(x)/dt$, with a measuring function $F(y)$ comprising,
   comparing means for comparing said functions $F(x)$ and $F(y)$ to form an error signal $F(x,y)$,
   a tracking control means, controlled by said error signal, for producing a velocity signal $dF(y)/dt$ which tracks said variation $dF(x)/dt$, and
   generator means responsive to said velocity signal $dF(y)/dt$ to form said function $F(y)$ whereby said function $F(y)$ tracks and is a measure of said function $F(x)$.

2. The apparatus of claim 1 wherein said tracking control means further includes,
   first integrator means for integrating under control of a control signal an acceleration signal $d^2F(y)/dt^2$ to form the velocity signal $dF(y)/dt$, and
   control signal generator means for generating said control signal from said error signal $F(x,y)$ to control the direction of integration of said first integrator means.

3. The apparatus of claim 2 wherein said control signal generator includes means for generating said control signal by forming the electrical analog of each term of the control signal, $\overline{CS}$, defined by the following equation:
   $$\overline{CS} = F(x,y) + dF(x,y)/dt.$$

4. The apparatus of claim 2 wherein said control signal generator includes means for generating said control signal by forming the electrical analog of each term of the control signal, CS, defined by the following equation:

$$\overline{CS} = F(x,y) + (\tfrac{1}{2})[(dF(x,y)/dt) + \frac{(dF(x,y)/dt)}{|dF(x,y)/dt|}(dF(x,y)/dt)^2]$$

5. The apparatus of claim 2 wherein said first integrator means includes a digital velocity counter for accumulating and storing a velocity count and wherein said apparatus includes,
   means providing output pulses having a frequency representing the magnitude of the velocity count to thereby form said velocity signal $dF(y)/dt$.

6. The apparatus of claim 5 wherein said means for providing includes,
   a digital frequency counter having a plurality of stages exhibiting output pulses of different frequencies, and
   a frequency selector for decoding the contents of said digital counter to select appropriate ones of said stages to provide output pulses at a frequency representing the magnitude of said velocity count.

7. The apparatus of claim 1 wherein
   A. said tracking control means further includes:
      an acceleration source generating an acceleration signal $d^2F(y)/dt^2$ in the form of a constant frequency first pulse train,
      a first integrator means for integrating said acceleration signal $d^2F(y)/dt^2$ to form said velocity signal $dF(y)/dt$, said first integrator means including first bidirectional counter means for counting the pulses in said first pulse train in an up or down direction to accumulate and store a count representing $dF(y)/dt$,
      control signal generator means for generating a control signal in the form $$CS = F(x,y) + (\tfrac{1}{2})\Big[(dF(x,y)/dt + \Big[\frac{(dF(x,y)/dt)}{|dF(x,y)/dt|}\Big](dF(x,y)/dt)^2\Big]$$

zero detector means for generating a zero detect signal in response to a zero count in said first bidirectional counter means,
      integration control means for controlling the counting direction of said first bidirectional counter means in response to said control signal, and for providing a sign signal identifying the positive or negative character of the count in said first bidirectional counter, and
      means providing output pulses to form a second pulse train exhibiting a frequency proportional to the count in said first bidirectional counter, and
   B. said generator means is a second integrator including second bidirectional counter means to accumulate and store a count proportional to $F(y)$ by counting the pulses in said second pulse train in an up or down direction as determined by said sign signal.

8. The apparatus of claim 7 further including a clock having a frequency $(N/2)F$,
   wherein said first bidirectional counter has a count range $R1$ and is stepped by said clock at frequency $(N/2)(F)/10$ to provide said first pulse train at frequency $(N/2)(F)/(10)(R1)$.
   and wherein said second counter means has a count range $R2$ for storing a digital count $n$ representing $F(y)$ and is stepped to change the value of $n$ at discrete frequencies, between 0 and $(N/2)(F)/10$ in whole-number multiples of $(N/2)(F)/(10)(R1)$.

9. The apparatus of claim 8 wherein said generator means further includes means for generating a pulse-width modulated signal at a fundamental frequency $(N/2)(F)/R2$ where the pulse width is proportional to $n/N$ where $N$ equals $2 \times (2)$ and $n$ ranges from 0 to $2 \times (R2)$.

10. The apparatus of claim 9 wherein said frequency $(N/2)(F)$ equals $10^7$ bits/sec and wherein said first count range $R1$ is $10^3$ thereby establishing said first pulse train at a frequency of $10^3$ bits/sec and thereby defining discrete frequencies as whole-number multiples $10^3$ bits/sec whereby the acceleration $d^2F(y)/dt^2$ is limited by $10^6$ bits/sec$^2$ and the velocity $dF(y)/dt$ is limited by $10^6$ bits/sec.

11. The apparatus of claim 10 wherein said count range $R2$ is $10^3$ so as to produce a fundamental frequency of $10^4$Hz where $N$ equals $2 \times 10^3$.

12. The apparatus of claim 2 wherein said comparing means is a position measuring transformer, wherein said $F(x)$ function is the space position, $x$, of two relatively movable members of said transformer, wherein said $F(y)$ function is an electrical angle, $y$, supplied to said transformer in the form of electrical $\sin(y)$ and $\cos(y)$ signals, and wherein said error signal is in the form of $\sin(y-x)$.

13. The apparatus of claim 12 wherein said control signal generator includes means for differentiating said error signal $\sin(y-x)$ to form a stability term $(dy/dt - dx/dt)(\cos y-x)$ and means for adding said stability term to a positional error term constituted by said error signal $\sin(y-x)$ to form an analog signal, $\overline{CS}$, of the form, $\overline{CS} = \sin(y-x) + (dy/dt - dx/dt)\cos(y-x)$.

14. The apparatus of claim 13 further including a threshold detector for forming said control signal as a binary 1 or 0 as a function of the plus or minus level, respectively, of said analog signal $\overline{CS}$.

15. The apparatus of claim 13 wherein said control signal generator further includes means for squaring said stability term to form a response term, $$\Big[\frac{(dy/dt - dx/dt)\cos(y-x)}{|dy/dt - dx/dt \cos(y-x)|}\Big][(dy/dt - dx/dt)\cos(y-x)]^2$$

and wherein said means for adding forms an analog signal, $\overline{CS}$, from the weighted sum of the positional error, stability, and response terms as follows:

$$\overline{CS} = \sin(y-x) + \tfrac{1}{2}\left[ dy/dt - dx/dt \cos(y-x) \right.$$
$$\left. + \left( \frac{(dy/dt - dx/dt \cos(y-x))}{|dy/dt - dx/dt \cos(y-x)|} \right)(dy/dt - dx/dt \cos(y-x))^2 \right]$$

16. The apparatus of claim 11 further including a threshold detector for forming said control signal as a binary 1 or 0 as a function of the plus or minus level, respectively, of said analog signal $\overline{CS}$.

17. Tracking apparatus including a position measuring device having a stationary element and having a movable element, said elements being inductively related, said position measuring device supplying an error signal depending on a comparison of the relative displacement of said inductively related elements with an input of trigonometrically related signals to said position measuring device, means for generating said trigonometrically related signals in response to said error signal, said error signal being operative to produce a number of pulses to change the values of said trigonometrically related signals an amount representing the displacement of said movable element, said change being in a direction reducing said error signal to a small value, said number of pulses being counted and stored for providing a digital readout, characterized in that means are provided for modifying said generation of trigonometrically related signals in accordance with a control signal which comprises the summation of (a) said error signal, (b) the rate of change of said error signal with respect to time, and (c) a function of said rate of change of said error signal, whereby there is a reduction of lag between said digital readout and the instantaneous position of said movable element when the latter is in motion.

18. Tracking apparatus including a position measuring device having relatively movable elements, said position measuring device supplying an error signal depending on a comparison of the relative displacement of said elements with an input of trigonometrically related signals to said position measuring device, means for generating said trigonometrically related signals in response to said error signal, said error signal being operative to produce a number of pulses to change the values of said trigonometrically related signals an amount representing the displacement of said relatively movable elements, said change being in a direction reducing said error signal to a small value, said number of pulses being counted and stored for providing a digital readout, characterized in that means are provided for modifying said generation of trigonometrically related signals in accordance with a control signal which comprises the summation of (a) said error signal, and (b) the rate of change of said error signal with respect to time, whereby there is a reduction of lag between said digital readout and the instantaneous position of said relatively movable elements when in motion.

19. A digital readout apparatus comprising,
a measuring transducer exhibiting a space position and receiving an input which produces an error signal as a function of the difference between the input and the space position,
means responsive to the error signal and the first derivative with respect to time of the error signal to cause the input to reduce, at different rates, the error signal toward zero.

20. The digital readout apparatus of claim 19 wherein said means further includes a first counter for digitally tracking the first derivative with respect to time of said space position and a second counter apparatus for counting at a rate controlled by said first counter to form said input as a measure of said space position.

21. The digital readout apparatus of claim 20 wherein said second counter divides each cycle of said measuring transducer into N parts and wherein said control means is operative to track said space position by storing a digital value $n$ as a measure of the space position which is accurate to within one part of the N parts.

22. The digital readout apparatus of claim 21 wherein said control means causes said second counter means to digitally oscillate with a one bit oscillation to define the value $n$ as a static null measurement of the space position whenever the space position is not changing.

23. The digital readout apparatus of claim 21 wherein said control means causes the rate of change of said digital value $n$ to change in a manner which tracks and oscillates about the rate of change of said space position whereby $n$ is a dynamic null measurement of said space position.

* * * * *